(12) United States Patent
Rajasingham

(10) Patent No.: US 6,547,315 B1
(45) Date of Patent: *Apr. 15, 2003

(54) EASY EJECTOR SEAT WITH SKELETAL CRASH SAFETY BEAM

(76) Inventor: Arjuna Indraeswaran Rajasingham, 6024 Bradley Blvd., Bethesda, MD (US) 20817

( * ) Notice: Subject to any disclaimer, the term of this patent is extended or adjusted under 35 U.S.C. 154(b) by 0 days.

This patent is subject to a terminal disclaimer.

(21) Appl. No.: 09/404,475

(22) Filed: Sep. 24, 1999

Related U.S. Application Data

(63) Continuation of application No. 08/936,626, filed on Sep. 24, 1997, now Pat. No. 6,059,354.

(51) Int. Cl.$^7$ .............................................. B60R 27/00
(52) U.S. Cl. .................... 296/188; 296/189; 296/65.11; 296/68.1
(58) Field of Search ................................ 296/63, 65.01, 296/67, 68, 68.1, 65.02, 65.03, 65.11, 65.12, 65.13, 65.14, 65.15, 188, 189; 180/282; 297/344.11, 487, 488, 216.1, 216.11, 216.16, 216.18, 411.44; 280/734, 735

(56) References Cited

U.S. PATENT DOCUMENTS

| | | | | |
|---|---|---|---|---|
| 2,148,950 A | * | 2/1939 | Maier | |
| 2,587,679 A | * | 3/1952 | Atkinson | |
| 2,710,222 A | * | 6/1955 | Barenyi | |
| 2,753,947 A | * | 7/1956 | Mach | |
| 2,758,872 A | * | 8/1956 | Solomon et al. | |
| 2,777,531 A | * | 1/1957 | Erickson | |
| 2,873,122 A | * | 2/1959 | Peras | ............. 296/68.1 X |
| 3,071,407 A | * | 1/1963 | Sloan | |
| 3,129,017 A | * | 4/1964 | Graham | |
| 3,545,789 A | * | 12/1970 | Graham | |
| 3,713,695 A | * | 1/1973 | Von Wimmersperg | |
| 3,735,398 A | * | 5/1973 | Ross | |
| 3,762,505 A | * | 10/1973 | Morse | |
| 3,922,030 A | * | 11/1975 | Stedman | |
| 3,944,277 A | * | 3/1976 | Cyphert | ..................... 296/68 |

(List continued on next page.)

FOREIGN PATENT DOCUMENTS

| | | | |
|---|---|---|---|
| DE | 39 15 173 | * | 11/1989 |
| DE | 42 12 091 | * | 10/1993 |
| JP | 5-114621 | * | 2/1979 |
| JP | 1-95948 | * | 4/1989 |

OTHER PUBLICATIONS

C. Clark, C. Blechschmidt. "Human Transportation Fatalities and Protection Against Rear and Side Crash Loads by the Air Stop Restraint." 1965. Stapp Car Crash Conference.

(List continued on next page.)

Primary Examiner—Joseph D. Pape

(57) ABSTRACT

An arrangement in passenger vehicles, that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. An indo-skeletal structural arrangement proposed for the vehicle, provides further benefits by targeting the strength of the vehicle to protect passengers while minimizing other massive elements in the vehicle.

68 Claims, 25 Drawing Sheets

U.S. PATENT DOCUMENTS

| | | | | |
|---|---|---|---|---|
| 3,951,429 A | * | 4/1976 | Satzinger | |
| 3,961,805 A | * | 6/1976 | Satzinger | |
| 3,981,520 A | * | 9/1976 | Pulling | 296/68.1 X |
| 4,082,350 A | * | 4/1978 | Tomforde | |
| 4,512,604 A | * | 4/1985 | Maeda et al. | 296/68.1 |
| 4,533,172 A | * | 8/1985 | Oliver | 296/185 |
| 4,580,842 A | * | 4/1986 | Segal | 297/488 |
| 4,664,443 A | * | 5/1987 | Casale | 297/488 X |
| 4,671,563 A | * | 6/1987 | Shakespear | 296/66 X |
| 4,815,777 A | * | 3/1989 | Campbell | 293/107 |
| 4,995,659 A | * | 2/1991 | Patk | 293/107 |
| 5,000,509 A | * | 3/1991 | Sinnhuber et al. | 296/188 |
| 5,131,703 A | * | 7/1992 | Stirling | 293/127 |
| 5,213,300 A | * | 5/1993 | Rees | 296/65.1 X |
| 5,435,618 A | * | 7/1995 | Sacco et al. | 296/188 |
| 5,464,266 A | * | 11/1995 | Guertler | 296/189 |
| 5,474,353 A | * | 12/1995 | Koester et al. | 296/65.1 |
| 5,476,309 A | * | 12/1995 | Chen | 297/487 |
| 5,531,470 A | * | 7/1996 | Townsend | 280/730.2 |
| 5,660,428 A | * | 8/1997 | Catlin | 296/205 |
| 5,671,968 A | * | 9/1997 | Masuda et al. | 296/188 |
| 5,716,094 A | * | 2/1998 | Bhalsod et al. | 296/68.1 X |
| 5,722,617 A | * | 3/1998 | Cecinas | 296/68.1 X |
| 5,725,265 A | * | 3/1998 | Baber | 293/107 |
| 5,810,427 A | * | 9/1998 | Hartmann et al. | 296/189 |
| 5,947,543 A | * | 9/1999 | Hubbard | 296/68.1 |
| 6,206,466 B1 | * | 3/2001 | Komatsu | 297/216.13 |
| 6,209,909 B1 | * | 4/2001 | Breed | 280/735 |
| 6,260,913 B1 | * | 7/2001 | Sekita et al. | 296/66 X |

OTHER PUBLICATIONS

C. Clark. "Extended Bumper and Glass Plastic Glazing Methods to Reduce Intrusion and Ejection in Severe Motor Vehicle Crashes". 1993. 26$^{th}$ International Symposium on Automotive Technology Automation.

C. Clark., W. Young. "Airbag Bumpers Inflated just before the Carsh" 1994. SAE Technical Paper Series.

C. Clark. "The Crash Anticipating Extended Bumper System" 1994. 14$^{th}$ International Technical Conference on the Enhanced Safety of Vehicles.Munich.

C. Clark. "Airbag Bumpers as a Means to Reduce Crash Loads and Intrusion and Increase Intervehicular Compatibility" 1995. International Conference on Pelvic + Lower Extremity Injuries.

* cited by examiner

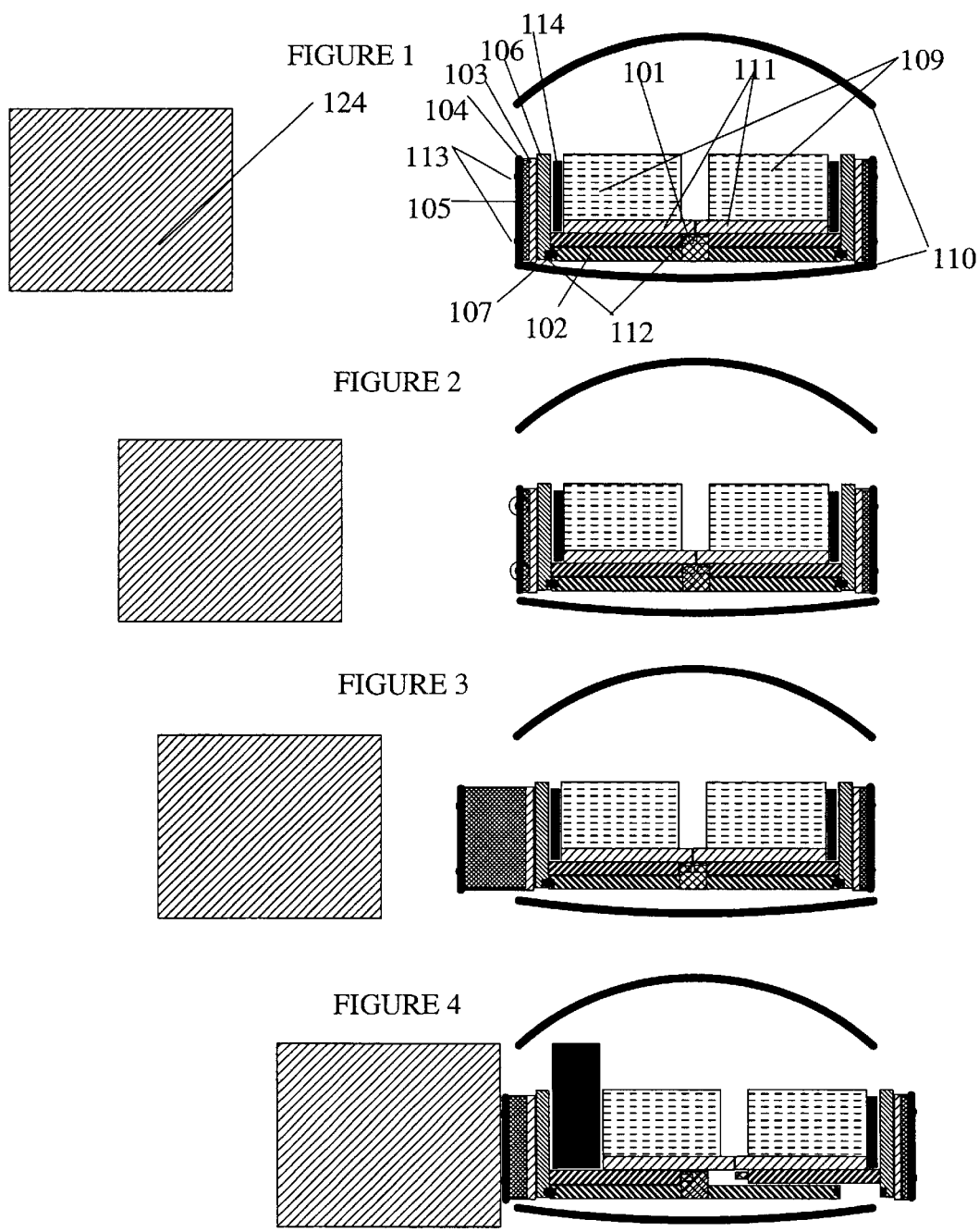

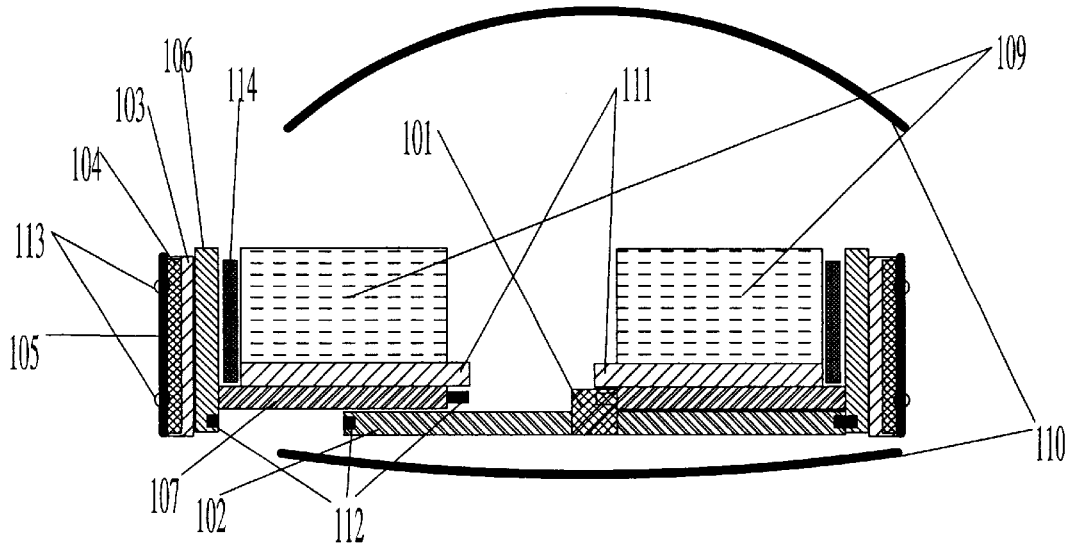
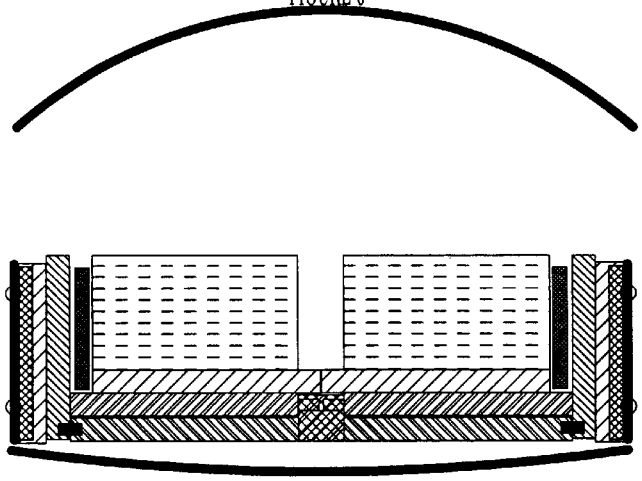

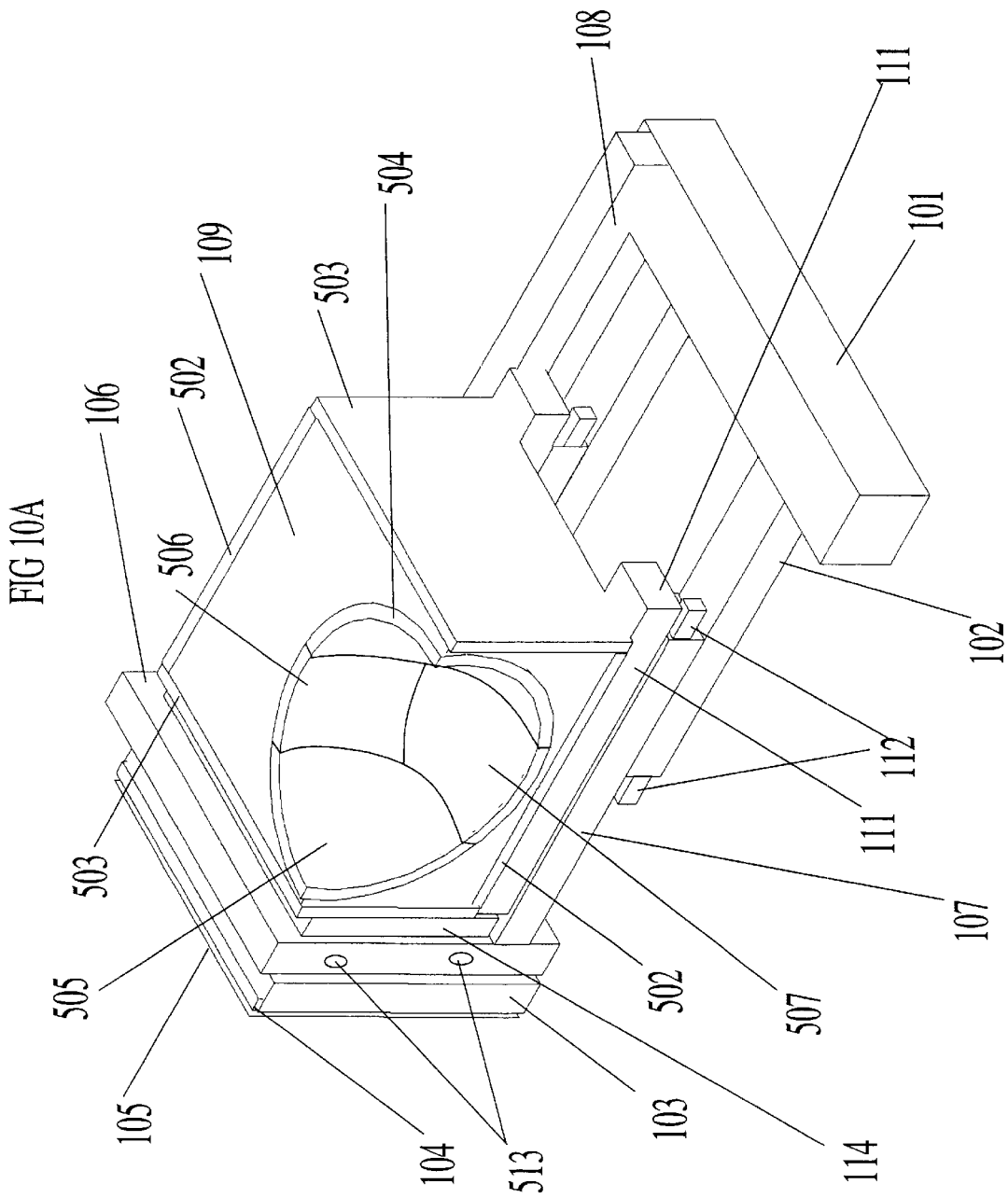

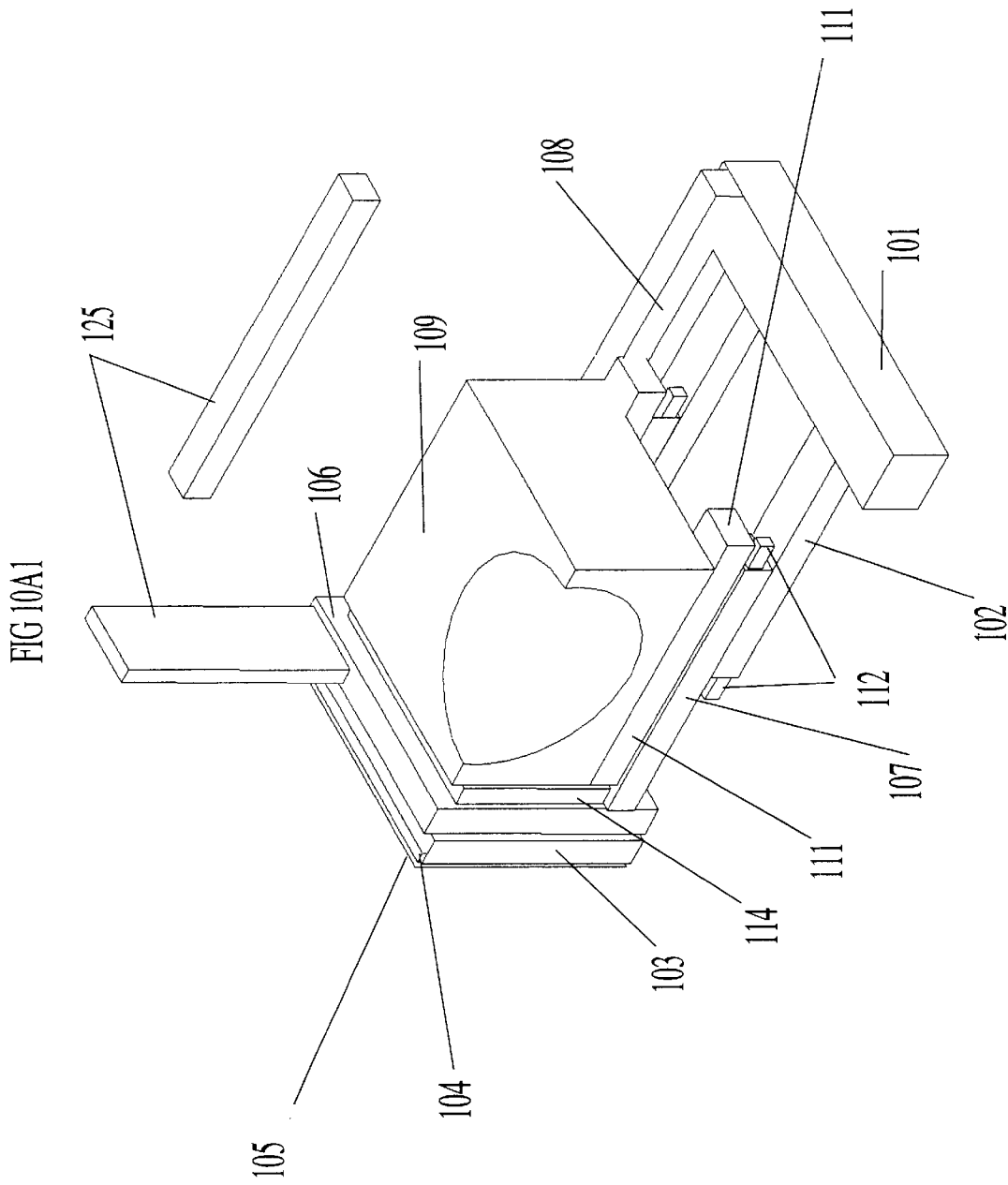

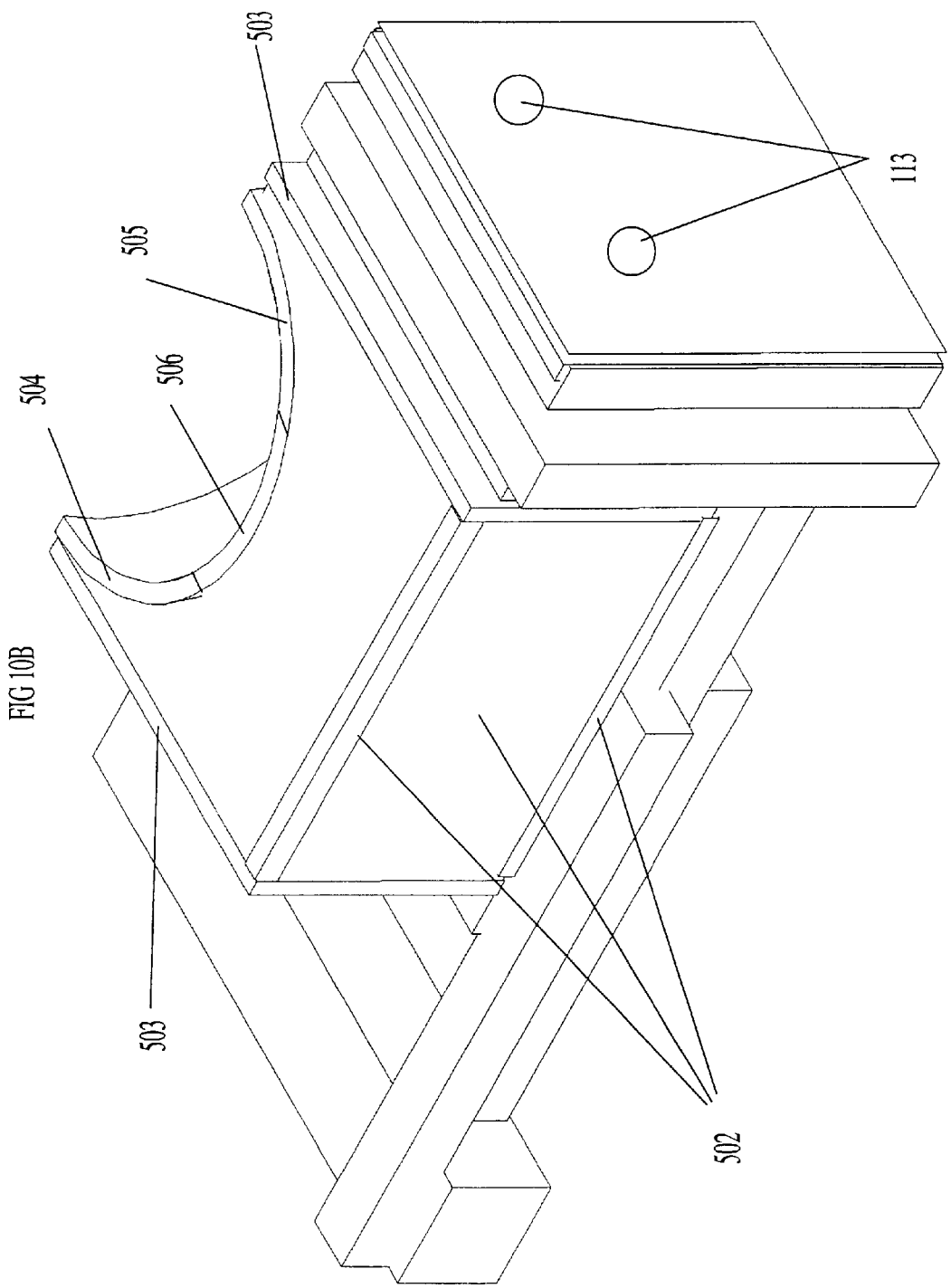

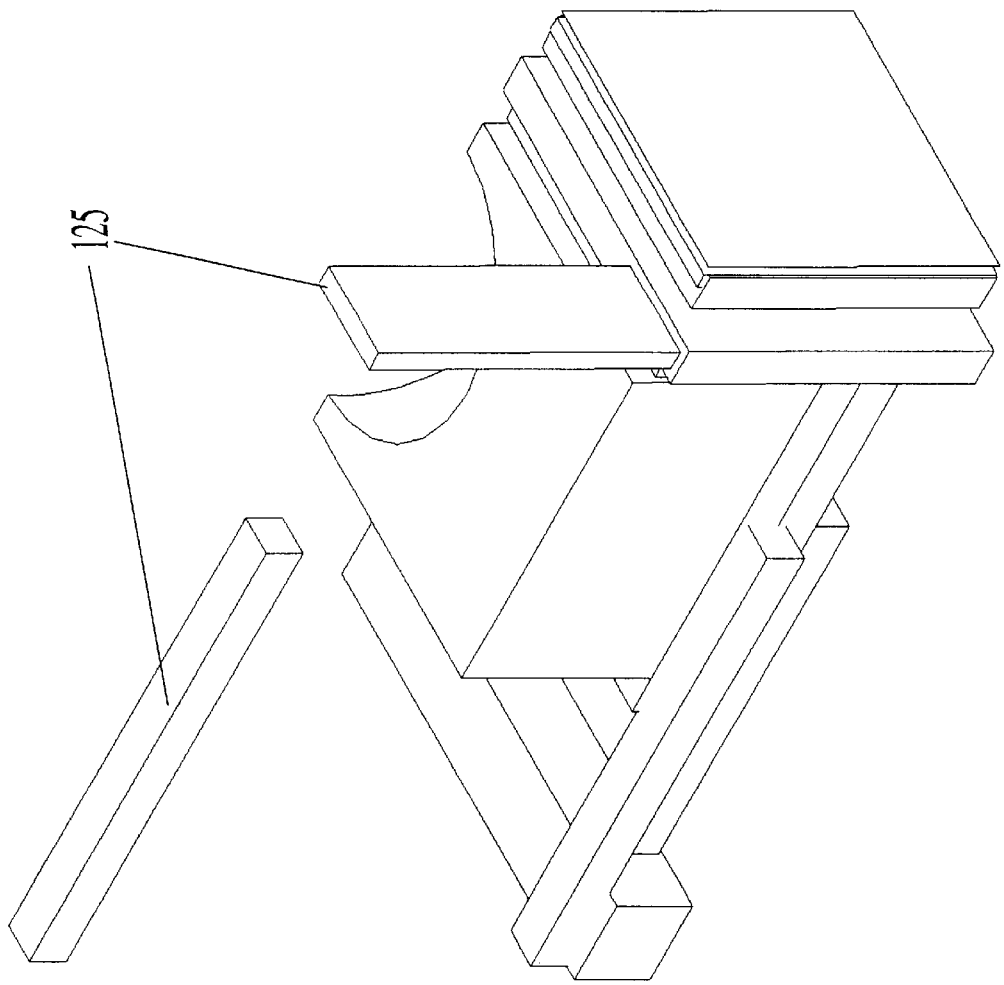

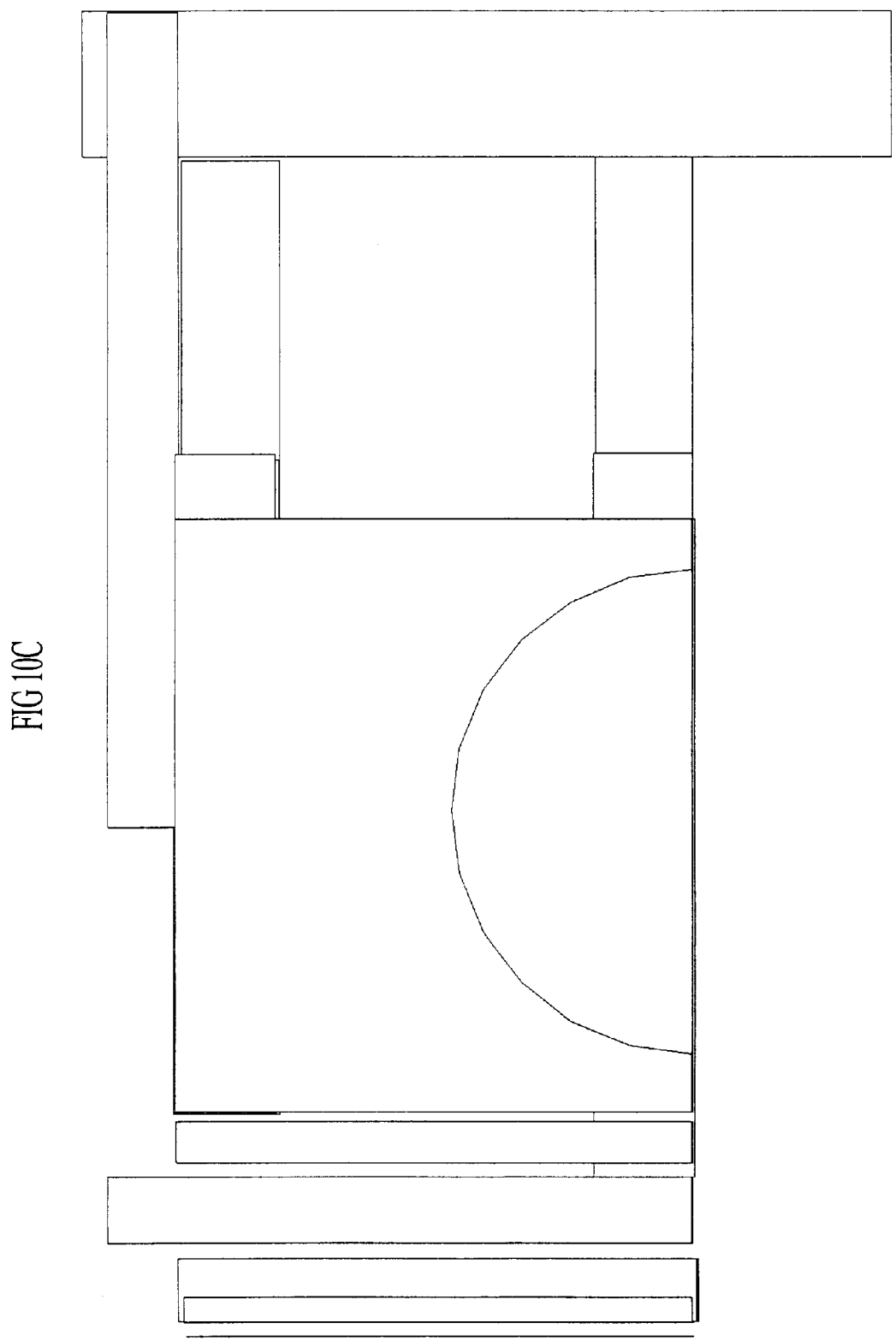

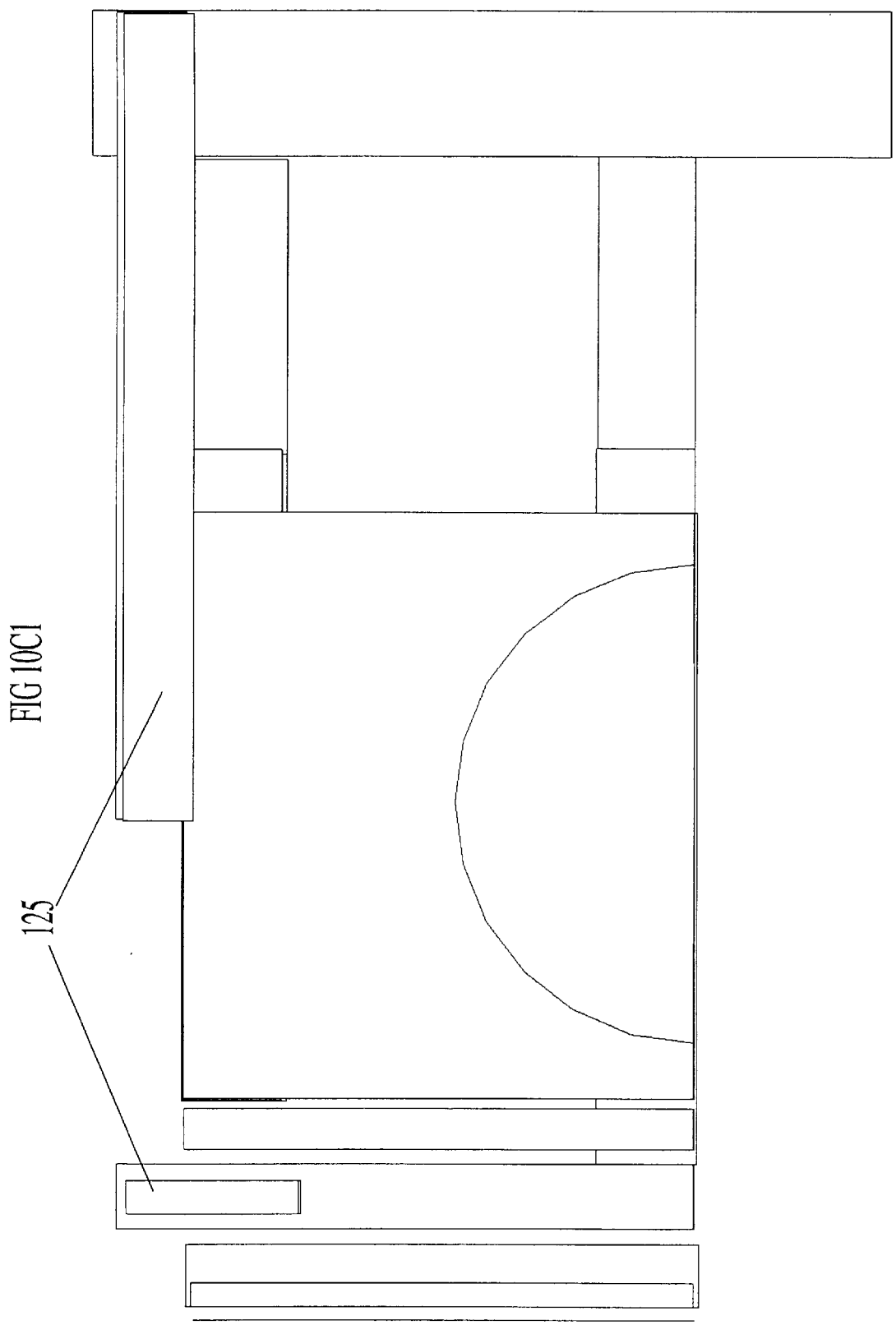
FIG 10C1

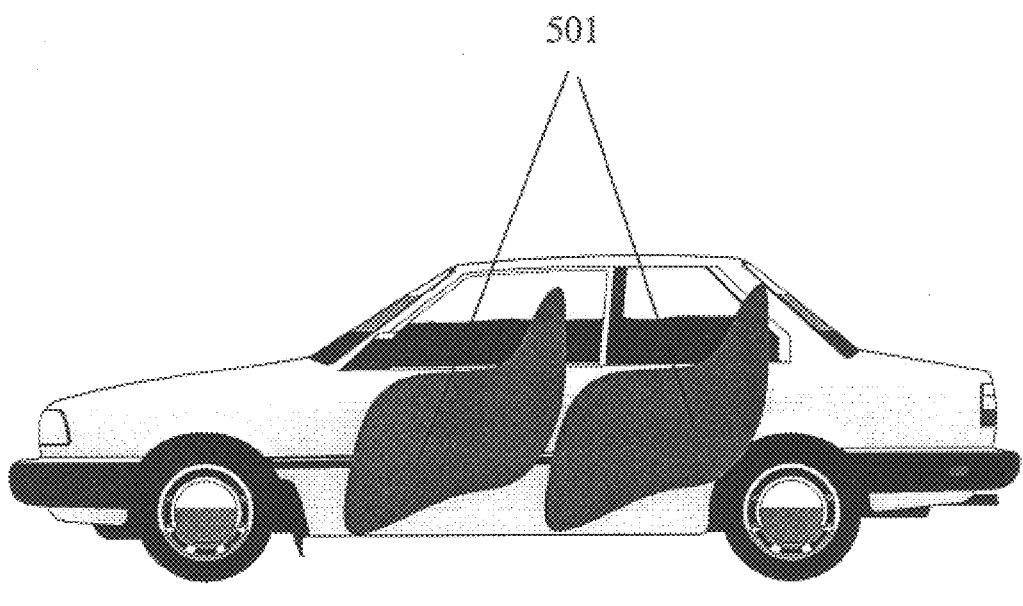
FIGURE 11 Safety Zones

FIGURE 12 A1
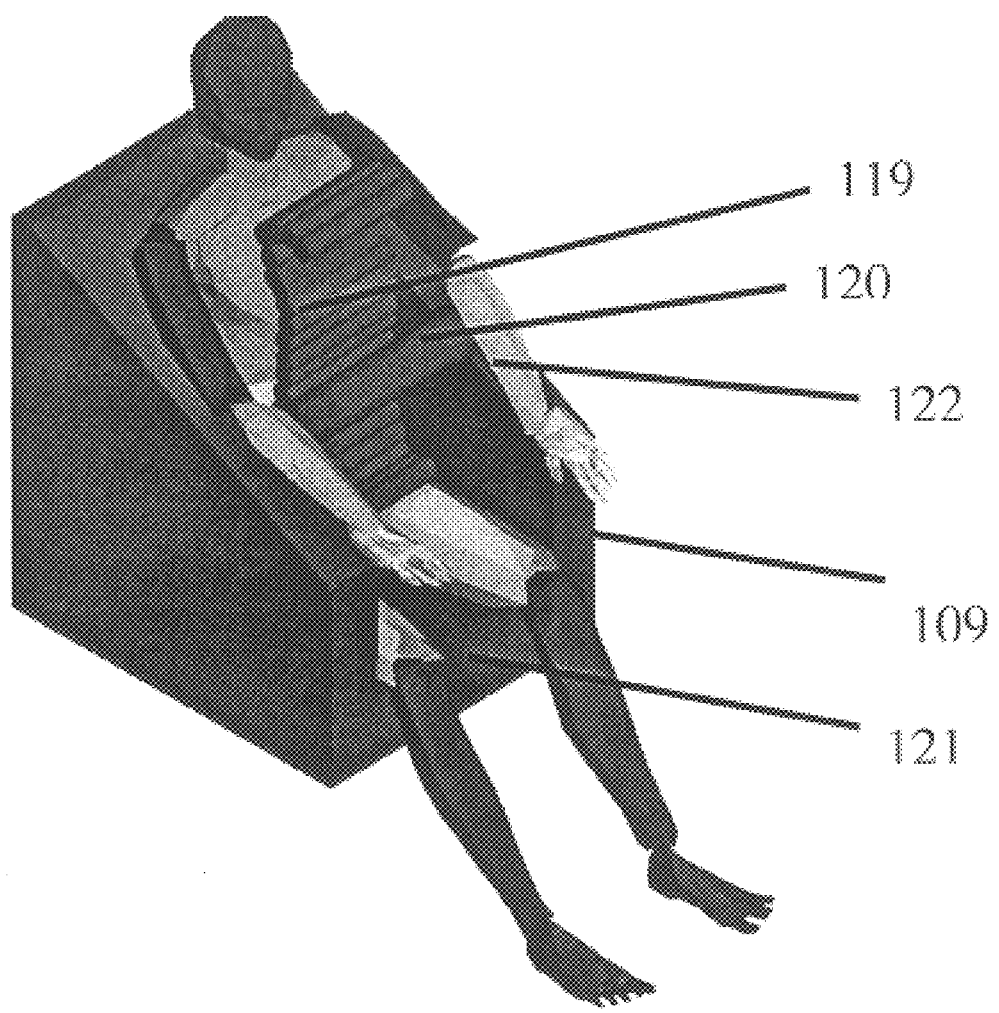

FIGURE 12 B1
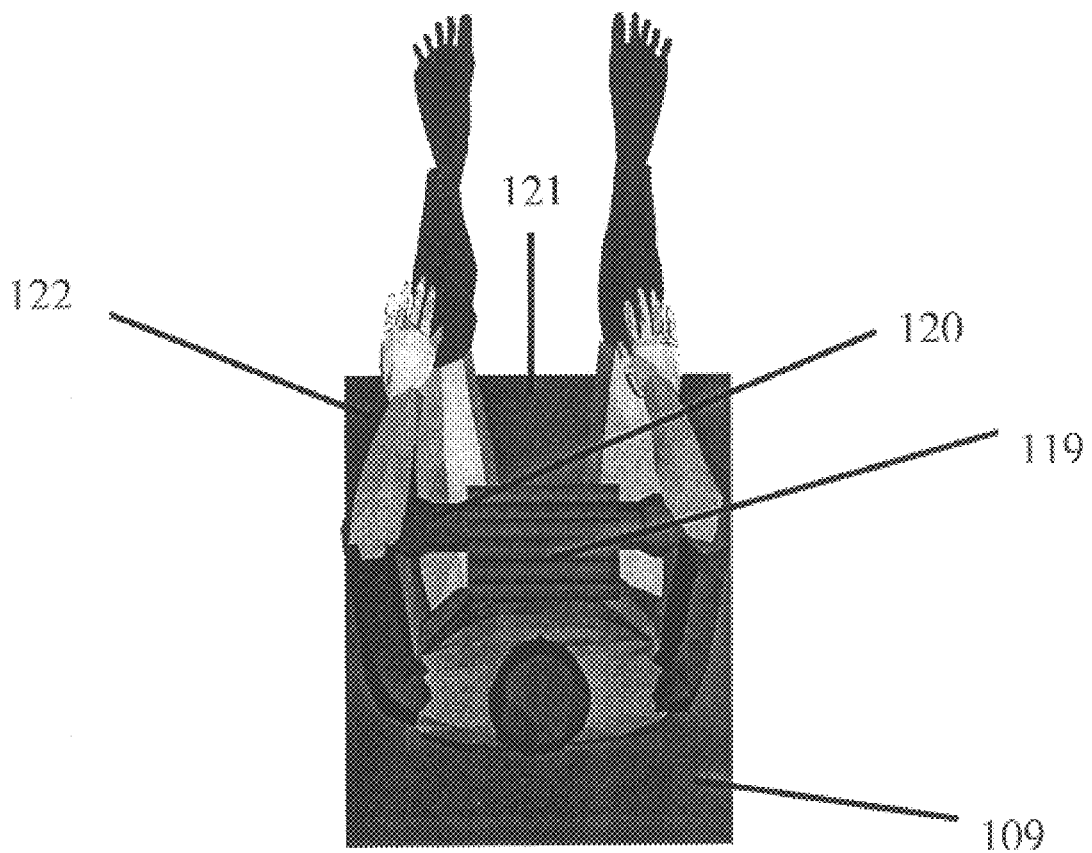

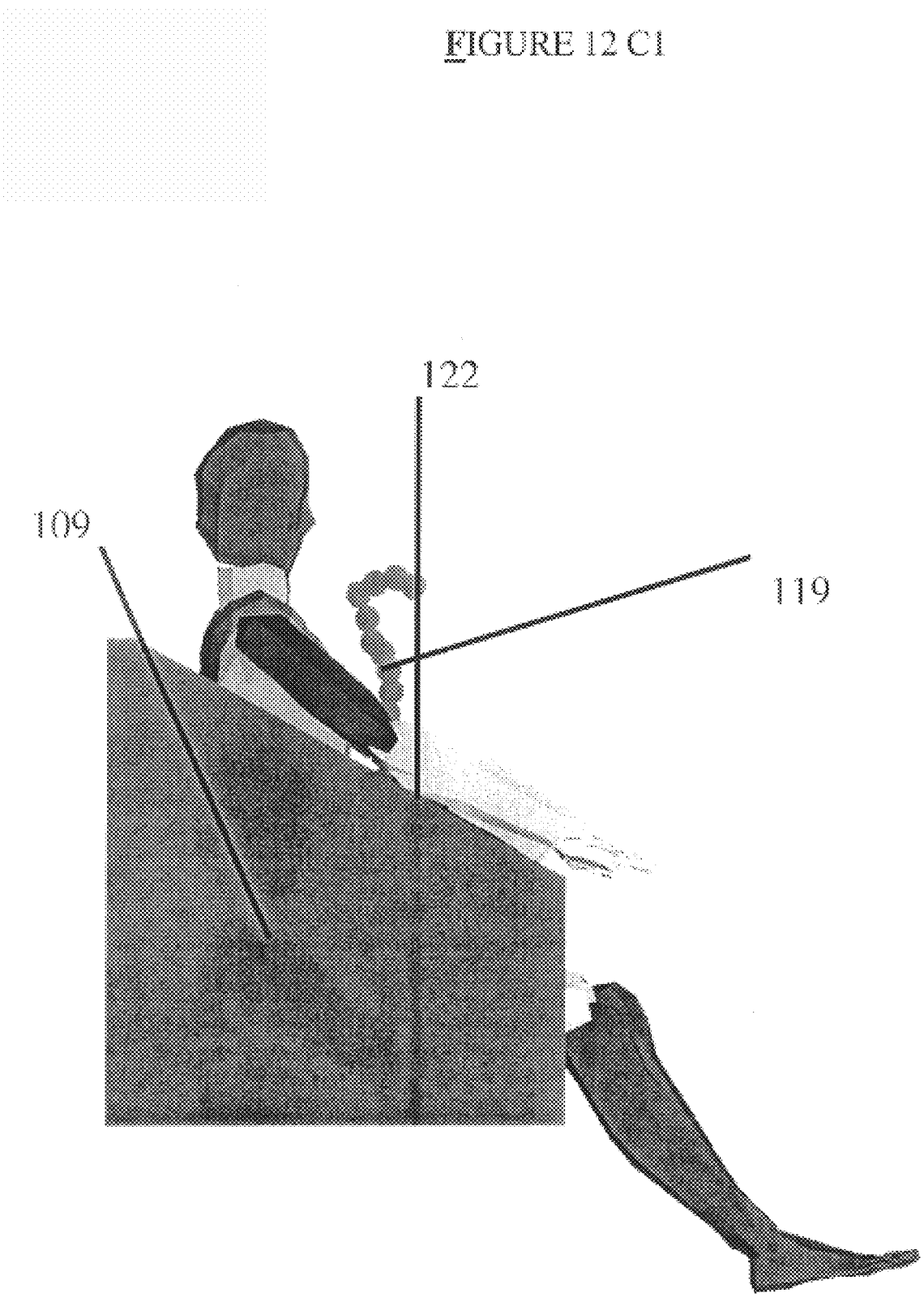
FIGURE 12 C1

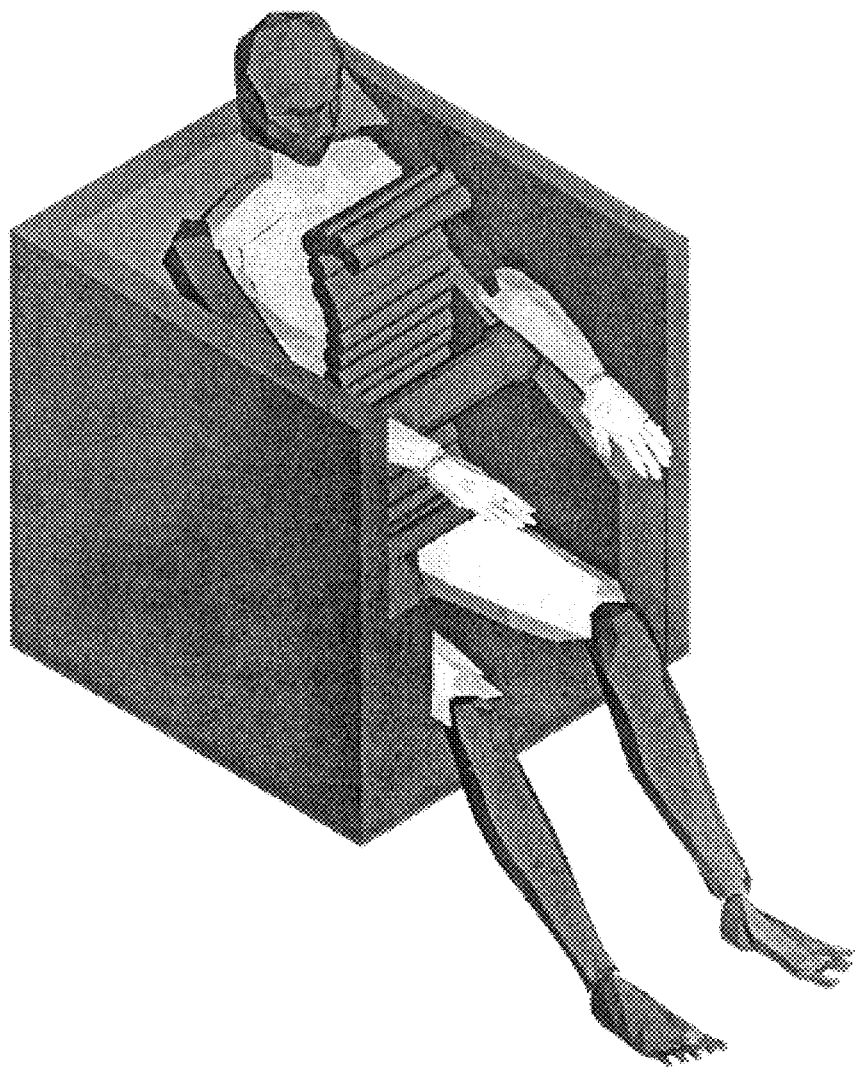
FIGURE 12E1

FIGURE 12 F2
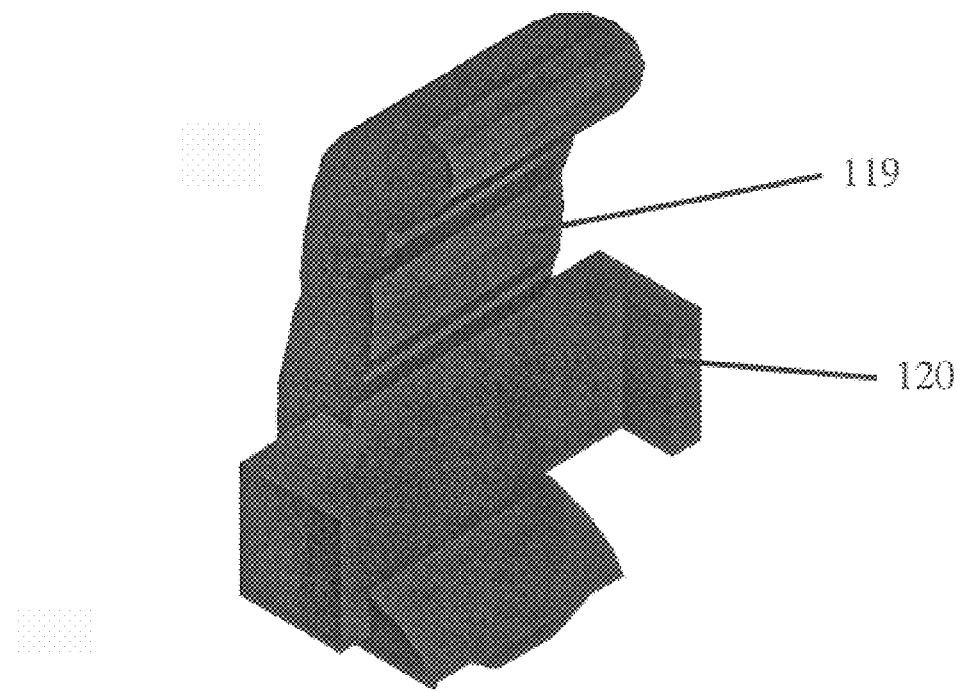
FIGURE 12 G2
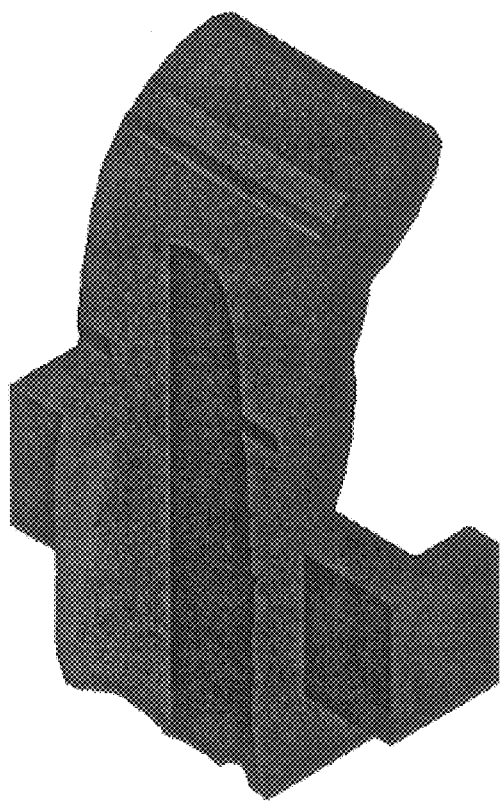

AN ISOMETRIC VIEW

EASY EJECTOR SEAT WITH SKELETAL CRASH SAFETY BEAM

CROSS REFERENCE TO RELATED APPLICATIONS

This Application is a continuation of application Ser. No. 08/936,626 filed Sep. 24, 1997, now U.S. Pat. No. 6,059,354 issued May 9, 2000, which is incorporated herein by reference in its entirety for all purposes.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

1. Field of Invention

The present invention defines a means to incorporate in passenger motor vehicles, unique safety arrangements particularly for lateral or side impacts that provide energy absorption by the mass of the vehicle but decouple the passenger from the impact acceleration and deceleration that is provided by the mass of the vehicle, thereby protecting the passengers during such collisions. Moreover, the same arrangement synergistically provides utility in access, comfort and further safety in the operating position for passengers and the driver.

2. Description of the Related Art

In the past safety of passengers was not always the priority in passenger vehicle design. In the evolution of motor vehicle design the structure moved from a chassis that held together the mechanical components of the vehicle—a structure that was then attached to a passenger compartment or to passenger seats. The design of the structure was to hold together the working components of the vehicle—a critical aspect at the time. Thereafter in more recent times right up to the present, Exo-skeletal designs have been the dominant paradigm. Here rigid shells were constructed to hold both the mechanical components and the passengers in fixed positions. However such fixed shell structures have had limited success in protecting passengers and drivers when there are lateral collisions as passengers undergo the same impact related accelerations and decelerations as the remaining parts of the vehicle, as space limitations don't allow for "crumple zones" as in the case of impact protection for head on collisions. Passengers are particularly vulnerable to side impacts as they cannot take preemptive measures as with head-on collisions where there is speed control and directional control that is available. As vehicle speeds have increased substantially in the last several decades, these safety considerations for passengers have become critical and urgent. Vehicle designers—particularly automobile designers—have risen admirably to the task by incorporating myriads of devices and additions within the rigid shell paradigm to minimize risk in the event of collisions. Such devices include restraints such as seat belts and certain types of protective air bags. However, there are limits within the rigid shell paradigm for two reasons: First, the energy of impact cannot be easily diverted away from passengers into the remaining mass of the vehicle on impact. Second, the rigid shell needs to support high shear stresses on lateral impact and related compressive loads to the passenger compartment of the vehicle a factor that can only be addressed with greater mass of the vehicle that will impact its performance.

Another area of interest in passenger vehicles is to provide, in synergy with the above contributions, utility and comfort of passengers and drivers and further synergistic head-on collision protection.

There are four areas of Background art that are related to the present invention. These are: vehicles with sliding seats, safety arrangements addressing lateral impacts on passenger vehicles, air bags and other shock absorbing devices, and miscellaneous safety devices for frontal impacts. None of the inventions in these areas individually or collectively state or imply any aspects of the present invention. Moreover, none of this Background art even addresses the issue of energy transfer away from the passengers to the mass of the vehicle on impact and concurrently provide a mechanism for easy access to the vehicle with ejector seats. This is despite the urgent need in the car industry for such safety and utility. Moreover the novelty of the present invention is underscored as it provides solutions hitherto unidentified in a very large and competitive industry that is acutely aware of these needs and is constantly in search of new solutions to them.

Sloan U.S. Pat. No. 3,071,407 (1963) describes a single rear bench seat (lines 4–45)—full length (C1-L55), that can slide out of either side of the vehicle. It describes a door structure that may be attached to the seat and slide across and through the passenger compartment of the vehicle as the seat slides out. This invention does not state or imply any safety considerations in its structure, moreover such a bench seat on slides, in the event of a lateral collision on the doors will focus the impact energy on the passengers and these passengers will be the principal casualties as the mass of the vehicle slides away little harmed. This will be the case even in the embodiment described where the doors are fixed to the seat and slides through the passenger compartment with the seat. Moreover, it cannot be used in a front seat even for its limited functionality with doors fixed to the seat as driving instrumentation (steering wheel etc) will not allow a door to slide through the compartment. Finally it does not provide any comfort features for passengers over and above a bench seat. Mach U.S. Pat. No. 2,753,947 (1956) describes a sliding bench seat for the access of the engine of the vehicle it does not address the issue of safety of passengers or access utility. It is expected to perform similarly to Sloan in an impact on the doors or around the side profile of the passengers in the vehicle. Solomon U.S. Pat. No. 2,758,872 (1953) provides a sliding bench seat that goes through the doorway and for the same reasons as Sloan does not provide protection in side impacts or provide any comfort features over and above a bench seat. Cyphert U.S. Pat. No. 3,944,277 (1976) describes a seat mounted on a sliding platform that has a door at the end and protective walls around it. The arrangement being designed for the utility of the operator to reach points away from the body of the vehicle without dismounting the vehicle. This invention like Sloan does not state or imply any safety considerations in its use. Moreover there is no expressed or implied reference to the utility of mounting and dismounting the vehicle or for the comfort of the operator or the passengers except for the ability for the platform to move out to give the operator greater reach away from the vehicle body. Rees U.S. Pat. No. 5,213,300 (1993) describes internal design structure for slide arrangements that allow forward and backward movement of the passenger seats in vehicles. This like many other inventions prior to it relate to the structure of the slides to adjust the position of the seats for passenger comfort in the direction of motion of the vehicle.

All the above items of background art relate to sliding seats. None of the above background art related to sliding seats have stated or implied safety considerations. Moreover, none of them provide utility for mounting and dismounting a vehicle except for a bench seat that slides out on either side of the vehicle, or provide comfort features except for seating arrangement on a bench seat and in one of the above—the lateral movement for convenience of the operator.

Maier U.S. Pat. No. 2,148,950 (1939) provides a laterally braced passenger compartment that braces a rigid shell body of a vehicle. Barenyi U.S. Pat. No. 2,710,222 (1955) provides a stiffening for the bottom plate of a vehicle body. Catlin U.S. Pat. No. 5,660,428 (1997) provides a design for a rigid shell structure. Guertler U.S. Pat. No. 5,464,266 (1995) uses stiffening arrangements for the floor of the vehicle as a component of a rigid shell vehicle body. Masuda U.S. Pat. No. 5,671,968 (1968) describes a strengthened rigid shell for the passenger compartment Oliver U.S. Pat. No. 4,533,172 (1985) describes a three part rigid shell structure for motor vehicles with the central section for passengers Sinnhuber U.S. Pat. No. 5,000,509 (1991) describes an arrangement that transfers impact energy from lateral impacts to the rigid body of the vehicle but does so through rigid members that include elements in the seats. The seats have limited lateral movement and are not free to move independent of the vehicle body in the event of a collision, thereby placing the passengers on the direct path of the energy transfer Maeda U.S. Pat. No. 4,512,604 (1985) describes a lateral brace for the seat arrangement of the vehicle within a rigid vehicle body structure thereby distributing the impact energy to other parts of the rigid body structure. Sacco U.S. Pat. No. 5,435618 (1995) describes a lateral stiffening element that braces the rigid vehicle body in the region of the seats. Bhalsod U.S. Pat. No. 5,716,094 (1998) describes a pusher block that engages the seat in the event of a lateral impact thereby providing a rigid member between the rigid body structure and the seats that can transfer impact energy to the seats.

All of the above items of background art related to bracing a rigid body structure and provide stiffening mechanisms within the rigid shell structure to distribute energy of lateral impact. None of these items of background art provide mechanisms to transfer energy away from passengers in lateral impacts. or provide other safety arrangements or provide utility for mounting and dismounting the vehicle or provide comfort features for passengers in the operating position.

Baber U.S. Pat. No. 5,725,265 (1998) presents airbags for front and rear vehicle bumpers that deploy on impact. Such devices cannot be implemented on the side of the vehicle as a deceleration zone is not available under operating conditions as may be made available in the front and back of the vehicle. Moreover, as this airbag deploys on impact it creates a deceleration zone by pushing its own vehicle away that may actually increase the impulse forces acting on the passengers. Mercier U.S. Pat. No. 3,822,076 (1974) describers similar external front and back airbags and uses probes that protrude from the vehicle at the front and back to deploy the airbags. Such apparatus cannot be installed on the sides of the vehicle, as clearances are small. Stirling U.S. Pat. No. 5,131,703 (1992) describes a fluid filled chamber around the vehicle that will provide a deceleration zone on impact—frontal rear or lateral. However this arrangement requires the deceleration zone to be present during normal operating conditions that will reduce the maneuverability of vehicles if deployed on the sides of the vehicle. Park U.S. Pat. No. 4,995,659 (1991) describes a gas filled chamber deployed around the vehicle. Such a chamber is normally inflated under normal conditions and reduces maneuverability of the vehicle. Campbell U.S. Pat. No. 4,815,777 (1989) describes a bumper that can be deployed selectively by filling with gas. This bumper is effective when extended only. It is not designed to be deployed when the vehicle is in motion , as it will reduce maneuverability. Hartmann U.S. Pat. No. 5,810,427 (1998) describes a mechanism that transfers fluid from one airbag to another on impact. The airbag that is deployed is normally in an extended position to absorb the impact energy and provide the deceleration zone. However, such an extended airbag will reduce the maneuverability of the vehicle.

There is a literature ("Extended Bumper and Glass-Plastic glazing methods to reduce intrusion and ejection in severe motor vehicle crashes". C. C. Clark 1993. 26th Symposium on Automotive Technology and Automation. Aachen Germany., "Airbag bumpers inflated just before the crash" C. C. Clark., William A. Young. 1994. SAE Technical Paper 941051., "The crash anticipating extended airbag bumper system". C. C. Clark. 1994. Fourteenth International Technical Conference on the enhanced safety of vehicles. Munich Germany., "Airbags as a means to reduce crash loads and intrusion, and increase intervehicular compatibility." C. C. Clark. 1995. International Conference on Pelvic and Lower extremity injuries-Proceedings Washington DC., Human Transportation Fatalities and Protection against Rear and Side CrashLoads by the Airstop Restraint" Carl Clark and Carl Blechschmidt. 1965. The Ninth Stapp Car Conference.) IDS, and background art on the construction of external airbags including deployment proactively with radar or other devices. This entire literature is limited to the use of proactive external airbags mounted on vehicles with rigid structures that include the passenger. There is no reference in this literature to the proactive detection of impact explicitly or implicitly creating a deceleration zone for passenger protection internally, relative to the vehicle as in the present invention. Moreover, this literature is focussed on external airbags for front impact protection with for example rigid penetration buffers to negotiate trees and posts, unlike the present invention which does not prescribe external airbags for front impacts. Furthermore, as this literature describes external airbags without perforation shields their implementability is questionable as, unlike internal airbags that are used in relatively protected environments, impact with external airbags often occurs with objects with sharp points and edges that are likely to perforate the external airbags. The Present invention requires perforation shields for external airbags.

All the above items of background art relate to air bag devices fir safety in vehicles. None of these items related to External Air Bags and related devices have expressed or implied reference to proactive deployment of such bags for a deceleration zone immediately prior to impact while not requiring this space for deployment under normal operating conditions of the vehicle. None of these devices provides a "Just in Time" deceleration zone for lateral impacts. This is a key consideration for lateral impact absorbing devices as lateral space is of the essence under operating conditions to allow reasonable maneuverability of the vehicle. Moreover none of these devices provide energy transferring mechanisms away from the passenger in a lateral impact or provide other safety features. Moreover they do not provide any utility features for passengers in mounting and dismounting the vehicle or provide comfort features to the passengers.

Perras U.S. Pat. No. 2,873,122 (1959) which describes an invention where upon a head-on collision the seat projects a curved protector around the passenger designed to protect the passenger. This curved protector retracts into the seat under normal operating conditions. It is not clear how effective such a mechanism will be as the acceleration of the passenger forward relative to the vehicle may precede that of curved protector's release from the seat. Satzinger U.S. Pat. No. 3,961,805 (1976) describes seat belts for frontal collisions that provide safety for vehicles. Such seat belts are in common use. However, they suffer from the drawback that they restrain the body of the passenger in the narrow regions covered by such belts which may cause injury as other parts of the body are not restrained. Moreover such belts are not popular, while in common use as the belts are in constant contact with the body—a factor that is not often relished. Pulling U.S. Pat. No. 3,981,520 (1976) describes an arrangement where that provides passenger movement and protection in frontal impacts. On impact the passenger moves in the vertical plane of motion to a more protected position while side firing airbags provide frontal protection. This system of deployment of airbags for frontal collision protection is similar to other frontal airbag systems. They are necessary as restraining systems during the collision but need to be retracted in conventional passenger compartments to give passengers access to their seats while mounting and dismounting the vehicle. Erickson U.S. Pat. No. 2,777,531 (1957) describes an invention that rotates the seat of the passenger thereby restraining and protecting the passenger on impact taking advantage of the inertia prior to impact to endow the passenger with rotational energy that changes the position of the seat. Such rotation can injure the passenger with impacts at present day passenger vehicle speeds.

All the above items of background art relate to frontal impact protection. None of these items provide a device that is normally deployed during operation, and provides a broad area of restraint across the body for the entire upper body, head and neck, without a need for changing the orientation of the passenger. Moreover none of these items provide any protection for side impacts or provide utility for mounting and dismounting the vehicle or for the comfort of the passengers in the operating position.

SUMMARY

In view of these prior references what would be useful is an arrangement that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. Moreover, it would be useful to have a synergistic structural arrangement for the vehicle that targets strength of the vehicle to protect passengers while minimizing other massive elements in the vehicle.

The present invention includes these objects and advantages.

Objects & Advantages

Some of the objects and advantages of the present invention are, to provide an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-a-vis the remaining mass of the vehicle. Furthermore the present invention differs sharply from the Background art in that the resulting structure synergistically permits the installation of contoured multi-element surround seats and a unique safety harness that protects passengers in head-on collisions, both of which may not be implementable without the slide or other moving arrangements for seats on either side of the vehicle in the present invention.

Another object and Advantage of the present invention is the gravity slide drive for my arrangement for which there is no counterpart in the Background art. This allows further Utility and weight and energy saving in implementing the above elements of the present invention.

Another Object and Advantage of the present invention includes External side Airbags that differ sharply from the Background art in that for the first time they proactively create a "Just in Time" deceleration zone for the lateral or side impact while not remaining in an extended position under normal operating conditions of the vehicle.

Another Object and advantage of this invention is a perforation resistant shield for external airbag protection that would reduce the probability of deployment failure. The background art does not provide for this function in externally deploying airbags.

Another object and advantage of the present invention is a indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

BRIEF DESCRIPTION OF DRAWINGS

FIG. 1 is an illustration of a front elevation of a seating arrangements in a passenger vehicle. This figure is an illustration of the invention in the normal vehicle operating condition. The impacting body is represented on the left as still distant but advancing towards the above passenger vehicle.

FIG. 2 is an illustration of the same vehicle arrangement as in FIG. 1, except that the impacting object has advanced towards the passenger vehicle adequately to trigger the distance and velocity sensors.

FIG. 3 is an illustration of the same vehicle as in FIGS. 1 and 2, except that the distance and velocity sensors have deployed the external Airbags. They may also provide delayed deployment of the internal Airbags.

FIG. 4 is an illustration of the same vehicle as in FIGS. 1, 2 and 3 except that the impacting object has made impact with deceleration and energy absorption provided by the External airbags and the shock absorbers and resisted by the mass of the vehicle through compression members as noted below. The Passengers and seats are free to move away from the impact on the secondary slides as the internal Airbag deploys, pushing out the Primary slide on the side away from the impact.

FIGS. 5 and 6 is an illustration of the seating arrangement as used for loading and unloading passengers and driver. FIG. 5 represents the open position and FIG. 6 represents the closed position.

FIG. 7 is an illustration of the Gravity Slide drive at the end of the unload cycle for passengers. FIG. 8 is an illustration of the Gravity slide drive at the beginning of the Load cycle for passengers. FIG. 9 is an illustration of the left side loaded and ready for operation of the vehicle and the right side at the start of the loading operation, emphasizing the independence of the two sides of the Gravity slide drive mechanism.

FIGS. 10A and B are an illustration of Isometric views of the present invention on one side of the vehicle for clarity. FIG. 10C is an illustration of a Plan view of the present invention for one side of the vehicle.

FIGS. 10A1, 10B1 are isometric views of an alternative embodiment with a vertical extension/"safety cage" to protect passengers further. FIG. 10C1 is a plan view of the same arrangement.

FIG. 11 is an illustration of the position of the "Safety Zones" that are targeted for protection with the Protector shields.

FIG. 12A is an illustration of an isometric view of the Seat arrangement. FIGS. 12B and 12C is an illustration of the Plan and Side Elevation of the seat arrangement. FIG. 12A1 illustrates an alternative embodiment of the seat arrangement. FIGS. 12B1 and 12C1 illustrate the plan and elevation of this embodiment. FIG. 12D1 illustrates an embodiment of the child seat. FIG. 12E1 illustrates an embodiment with a different external profile for the seat providing greater protection to the passenger. FIGS. 12F2 and 12G2 illustrate isometric views of an embodiment of the safety harness.

LIST OF REFERENCE NUMBERS

Figure 1B:
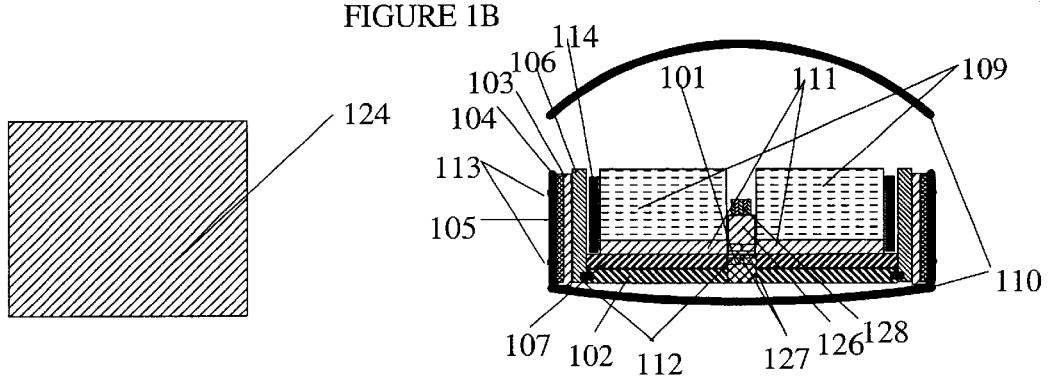
FIGS. 1B, 2B, 3B and 4B illustrate an alternative embodiment with a center console.

101—Central Member of Indo-skeletal structure
102—Safety Beam Lower Element/Lower Primary Slide
103—Side impact shock absorbers
104—External Air Bags
105—Perforation Shields
106—Protector Shields
107—Safety Beam Upper Element/Upper Primary Slide
108—Auxiliary Beam.( fixed or sliding)
109—Multi-element contoured passenger seat
110—Vehicle Shell/Body
111—Secondary Slides/Impact decouplers
112—Locking devices
112A—Pivot for Protector shield
113—Proactive Velocity/Distance Detectors
114—Internal side impact airbag
115—Spring device for manual slide
116—Inside door open button
117—outside door open button
118—Beam pivot for Gravity slide drive ejector
119—Safety Harness
120—Support for Safety Harness
121—Bottom of seating surface of the contoured seat
122—Contoured arm rests
123—Child seat attachment
124—Impacting body
125—Vertical extensions/Safety Cage (fixed or sliding)
501—Safety zones
502—Lateral Support Element
503—Reinforced seat side
504—left support adjustable multi-element
505—right support adjustable multi-element
506—back support adjustable multi-element
507—bottom support adjustable multi-element

DETAILED DESCRIPTION OF INVENTION

The present invention provides a passenger vehicle a structure that synergistically incorporates two functions. First, during lateral or side impacts, a means to decouple from impact, and protect passengers while projecting the remaining mass of the vehicle to decelerate the impacting body, and second, utility to passengers and drivers, in mounting and dismounting the vehicle with the comfort of contoured surround seats. The arrangement may in some embodiments use an indo-skeletal beam that allows such embodiments to rely on compressive force transmission to transfer impact energy to the mass of the vehicle rather than shear loads that are required in the shell paradigm of construction in most current passenger vehicles.

The present invention may use Primary and Secondary slides on each side of the vehicle, to meet these objectives. The Primary slide has among other attached devices, a protector shield that bears the impact force in lateral or side impacts. Such protector shields may be hinged out for access if the sliding arrangement is not used. The Primary Slide may engage a central indo-skeletal beam in some embodiments. The Secondary slide is attached among other devices to possibly contoured surround seats (the passenger support mechanisms). This slide may be activated under impact to guide passengers in their seats away from the impact zone.

The present invention may utilize a Safety Beam in the vicinity of the seats. However, there is an important advance over the Background art in that the Beam does not lock the passengers on the path of the energy transfer, but rather, conducts the energy of impact away from the passenger to the indo-skeletal frame or to the body members of the shell (collectively elements of the fixed body members) and thereby to the mass of the vehicle allowing independent motion of the passengers away from the impact.

The present invention may utilize a Safety Beam in the vicinity of the seats. However, there is an important advance over the Background art in that the Beam does not lock the passengers on the path of the energy transfer, but rather, conducts the energy of impact away from the passenger to the indo skeletal frame or to the body members of the shell (collectively elements to the fixed body members) and thereby to the mass of the vehicle (the massive components of the vehicle) allowing independent motion of the passengers away from the impact.

The following descriptions are for embodiments of the present invention. Deviations from this description in an embodiment is possible without deviating from the present invention.

Preferred Embodiment

Figure 1C:
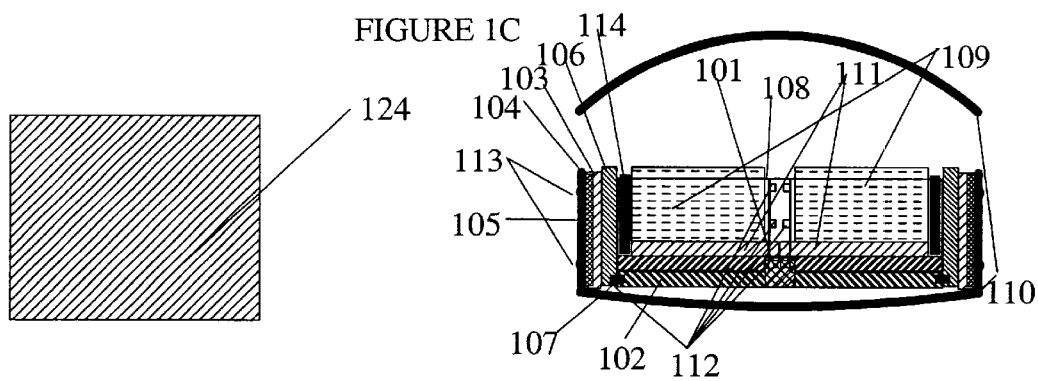
FIGS. 1C, 2C, 3C and 4C illustrate an alternative embodiment that has an auxiliary beam mounted behind the seat with a high section of the central member of the skeletal structure behind the seat to abut the auxiliary beam.
Figure 1D:
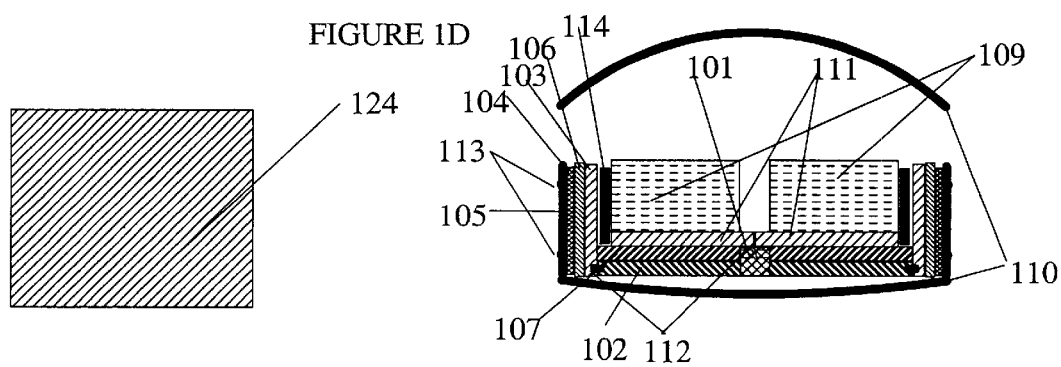
FIGS. 1D, 2D, 3D and 4D illustrate an alternative embodiment with the shock absorbers mounted internal to the protector shield.

The following is a detailed description of some of the components of this embodiment. The seating arrangement of a passenger vehicle is shown in FIG. 1. The cross section of the central member of the indo-skeletal structure (101) is fixed to the Safety Beam Lower Element/Lower Primary Slide (102). The Protector Shields (106) are firmly attached to the Safety Beam Upper Element/Upper Primary slide (107), which slides on the lower Primary slide (102). (The terms upper and lower being used for the slides Lo distinguish them and not representing a relative elevation of the slides). The construction of such protector shields would follow that of any impact resisting body panel member of a vehicle, with the usual weight strength tradeoffs. Such construction is well disclosed in the background art. The sliding arrangement may use single element or multiple element direct contact low friction surfaces sliding on one another, roller bearings, ball bearing structures—all of which are well disclosed in the background art. The Protector Shields (106) are designed to cover the required "safety zone" (501) as noted on FIG. 11. The Upper Primary Slide (107) locks into the Central member of the indo-skeletal structure (101) in the operating position with locking devices (112). Such locking devices do not take any additional loads on impact, and may as a result follow the extensive background art for locking devices for example similar mechanisms to those used in automobile door locks. These locks may be activated by the ignition key switch for additional safety while the vehicle is operational. The Protector Shield (106) has attached on the outside a shock absorber (103), which may include external airbags (104). The construction of such shock absorbers follow the background art. Such external airbag (104) is protected from sharp objects on impact by a Perforation Shield (105). These perforation shields protect the external airbag (and the passenger) from sharp objects. The construction of such perforation resisting shields are well disclosed in the background art. Such Perforation shields may be attached by conventional means to the outer surface of the airbag and retained in the normal operating position using techniques used for airbags both internal and external disclosed in the background art. The Air Bag (104) is deployed with distance and velocity sensors (113) mounted on the Perforation shields (105). Distance and velocity sensors are used in other applications and their construction is well disclosed in the background art. The Upper Primary Slide (107), supports the secondary slide/Impact decouplers (111). In this embodiment this is firmly attached to the Upper Primary Slide until the impact when it is decoupled to slide away from the impact. The Secondary slide arrangement may use a friction based approach, or other approach, all of which are well disclosed in the background art. This embodiment has contoured surround Passenger Seats (109) that are mounted on the Secondary slides (111). These seats have internal Airbags (114) that deploy on impact and may "unfurl" upwards to protect the head or upper body as well. The construction of seat adjustment mechanisms are well disclosed in the background art. This Figure shows the impacting object on the left approaching the vehicle, but too distant to trigger any action.

Figure 2B:
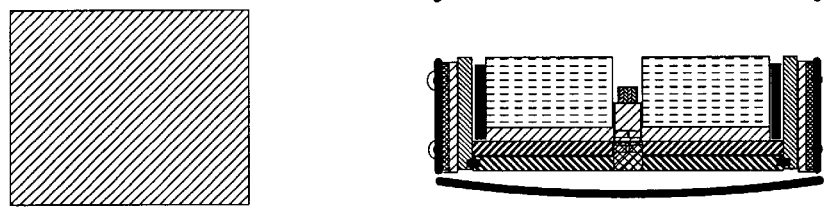
Figure 3B:
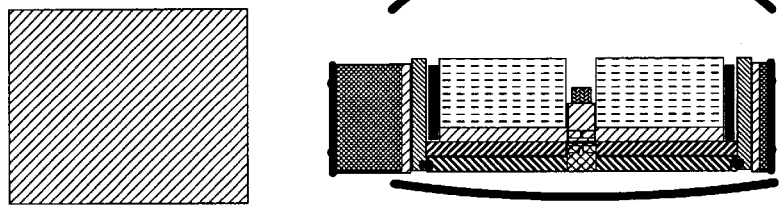
Figure 4B:
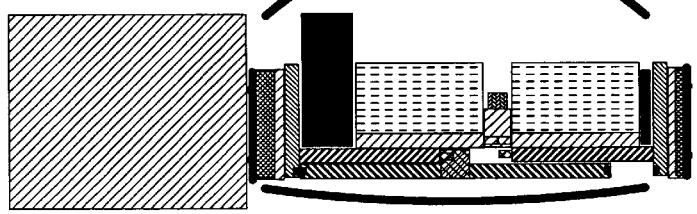
Figure 2C:
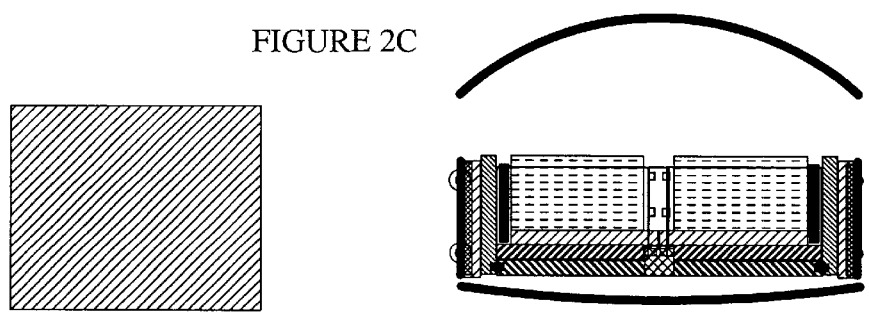
Figure 3C:
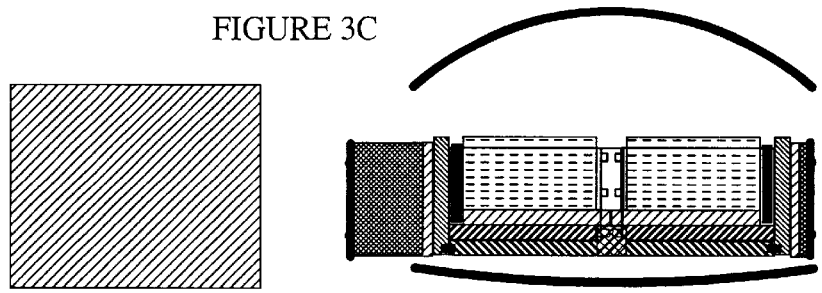
Figure 2D:
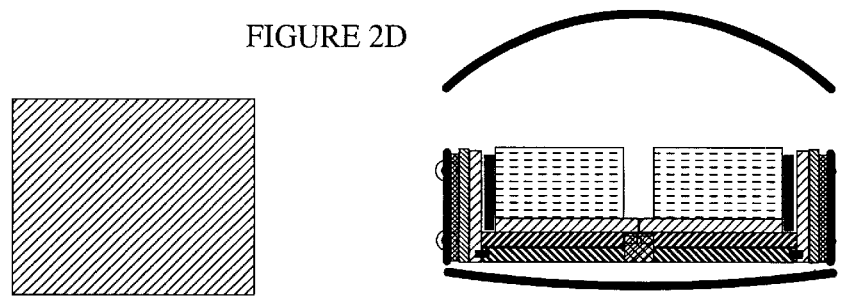
Figure 3D:
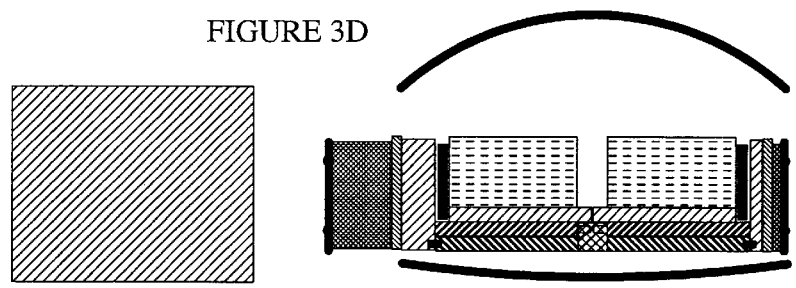
Figure 4D:
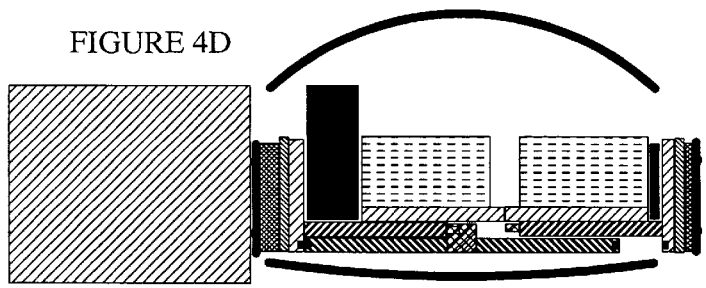

In FIG. 2, the impacting object has moved to a position that can now trigger the distance and velocity sensors (113). These sensors trigger the deployment of the External Airbags (104), and the shock absorbers (103). The internal airbags (114) may be triggered by conventional means disclosed in the prior art. Thereafter as illustrated in FIG. 3, the External Airbags (104) and shock absorbers (103) deploy to provide the required deceleration zone for the impact. As a result on impact the energy of impact is partially absorbed by the External Air bag (104) and the Shock Absorber (103) and the remaining energy transferred to the massive components of the vehicle through the Protector Shield (106), the Safety Beam Upper Element/Upper Primary Slide (102) and Safety Beam Lower Element/Lower Primary Slide (107) to the Central element of the Indo-skeletal frame (101) and the body of the vehicle. Notably, the Secondary slides (111) decouple and slide the passenger seats (109) with the passengers away outside the path of the impact forces and protected by the internal Airbag (114). The Upper Primary Slide (107) on the side of the vehicle away from the impact is free to slide out with all devices mounted on it to provide a path for the secondary slide (111) and the seats (109). In this situation it may be seen that the Upper Primary slide works as an impact-resisting beam on the side of the impact and a release and support mechanism on the side away from the impact.

Figure 14:
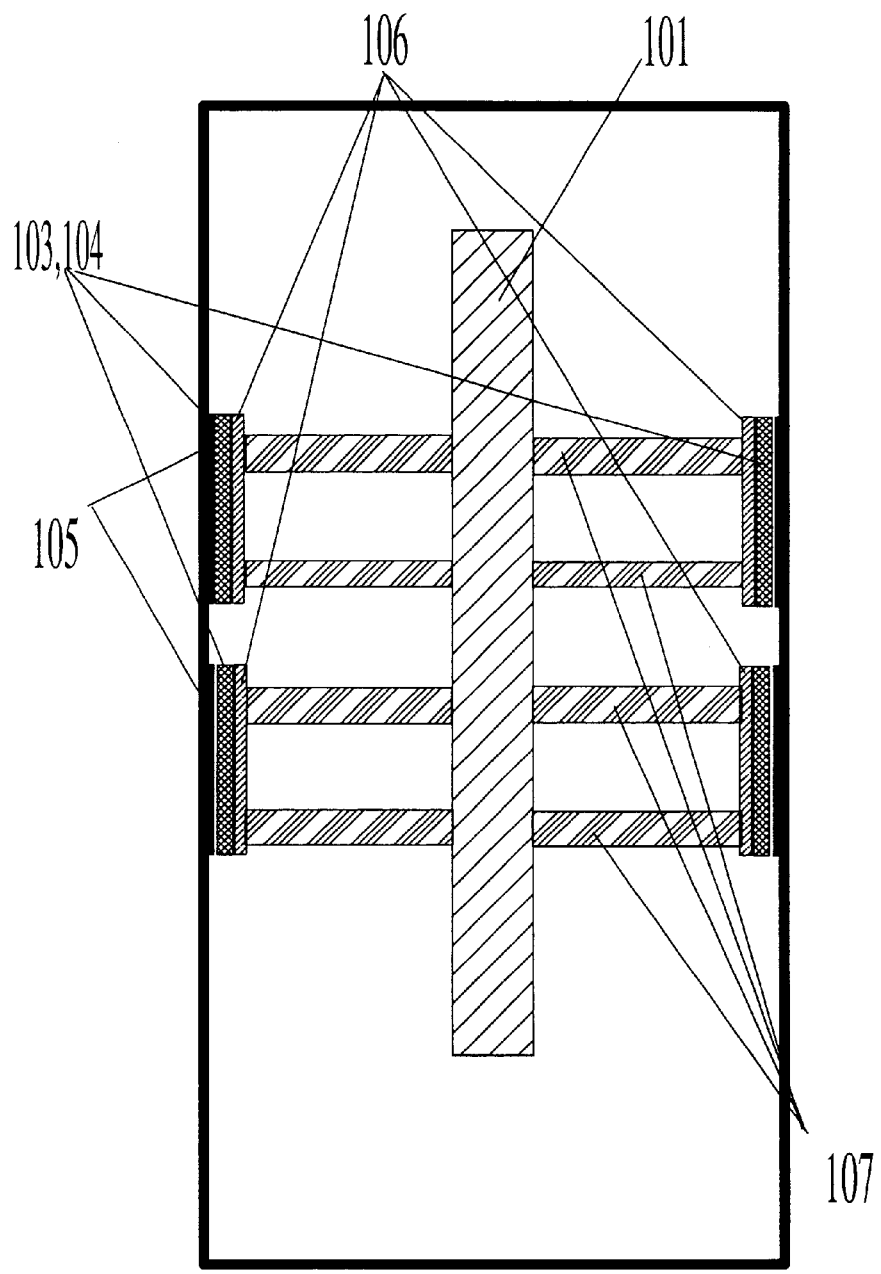
FIG. 14 illustrates a horizontal cross section of an embodiment of the present invention at the level of the upper primary slides.

FIG. 14 illustrates a horizontal cross section of the embodiment at the height of the upper primary slides (107). The central member of the indo-skeletal structure (101) is flanked by the upper primary slides (107) abutting the central member, with the protector shields (106) and the shock absorbers (103) and external airbags (104) at the outer end of the upper primary slides. The perforation shields are shown at the outer extreme of the shock aborbers and airbags. In this embodiment there are two sets of upper primary slides on each side of the vehicle that can support two rows of seats (front and rear) one on each side with its own protection with the protection shields and shock absorbing devices.

An auxiliary slide beam structure (108) (as illustrated in FIGS. 10A, 10B and 10C) may be attached to the central member of the Indo-skeletal beam (101) and locked into the protector shield when the vehicle is ready for operation, or be attached to the protector shield and slide out with the Upper Primary Slide (7), and get locked to the central member of the Indo-skeletal structure (1) in the operating position Means for access for passengers in this embodiment as illustrated in FIGS. 5, 6, 10A, 10B and 10C. The seat (109) and secondary slide (111), slide out on the upper Primary Slide (107) to a position that lets the seat (109) protrude from the vehicle such that the passenger may simply stand in front of the seat and sit down on the seat (109). Thereafter the seat (109) is retracted on the Primary slide to the position as depicted in FIG. 6, where the Upper Primary slide (107) is locked with the locking devices (112) in position for operation of the vehicle. The slide drive mechanism may be powered using approaches well disclosed in the background art. The vehicle while in operation should have the Upper Primary Slide (107) retracted and locked. The ignition lock is used in this embodiment to ensure this practice.

While extended, the clearance on the side of the vehicle for the Easy Ejector will usually be in the range of about 20 inches to 30 inches. This could be substantially less than the clearance required for opening a conventional car door. This is particularly useful for parking in areas with limited clearance.

Figure 12:
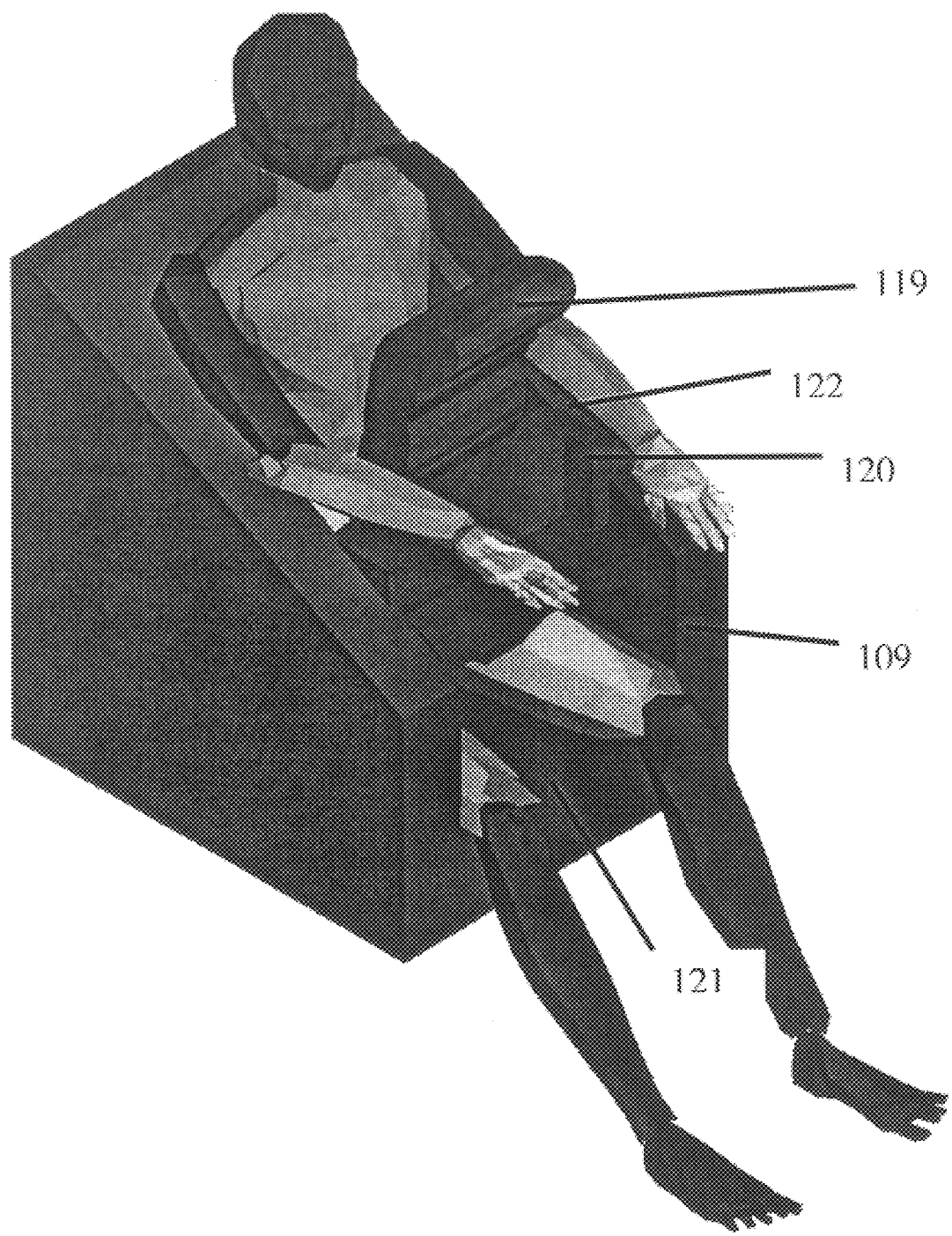
Figure 12:
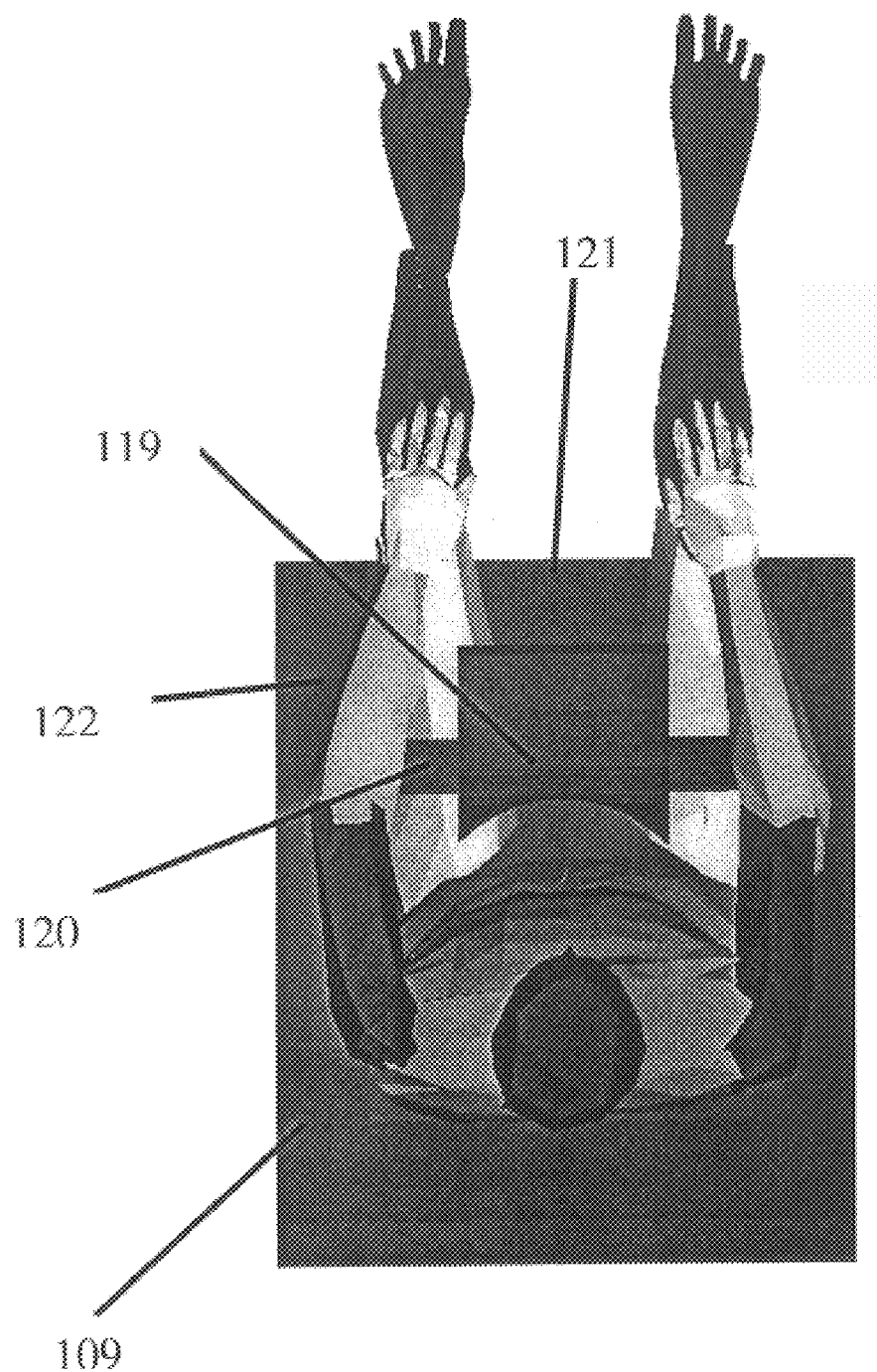
Figure 12:
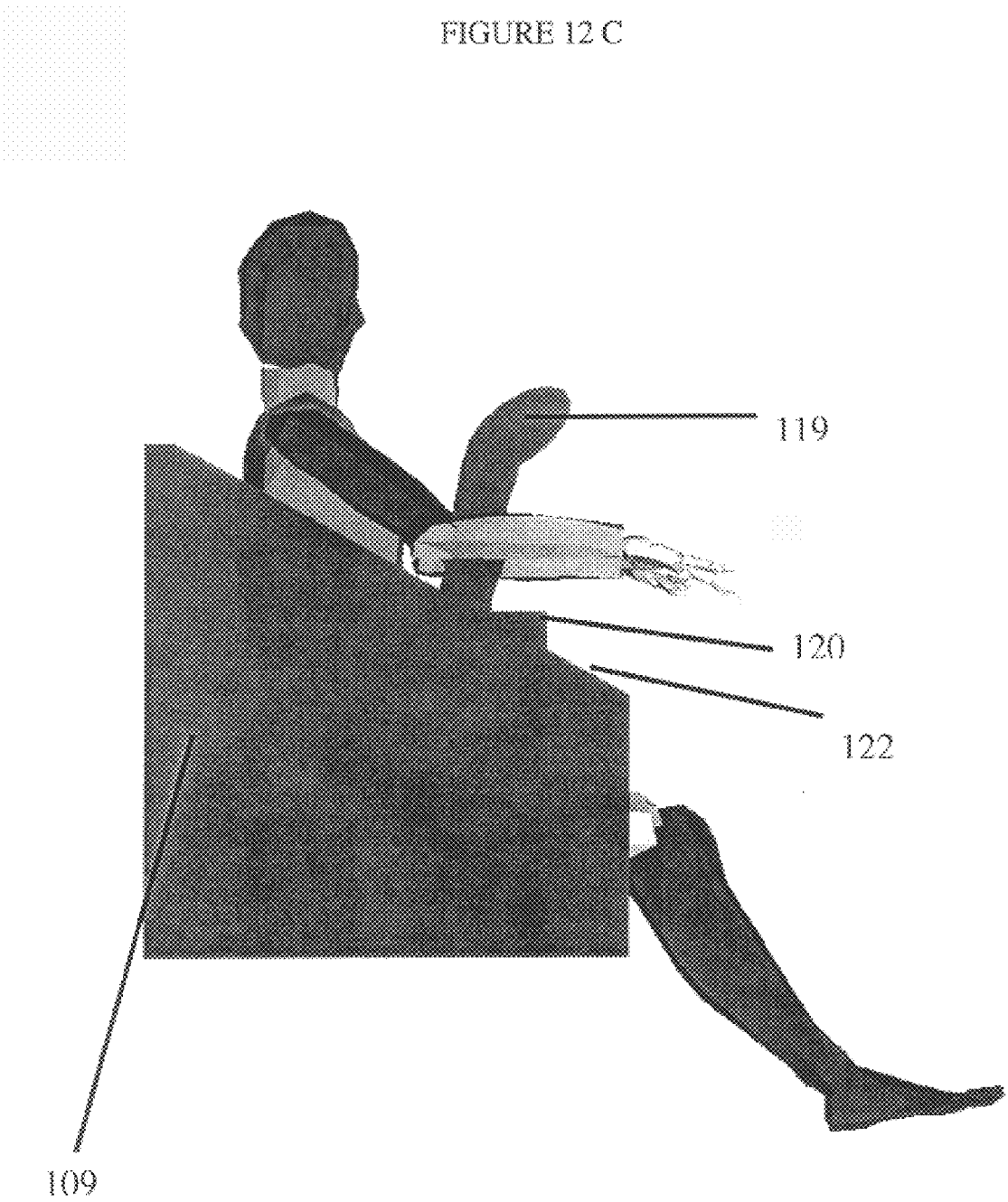
Figure 12:
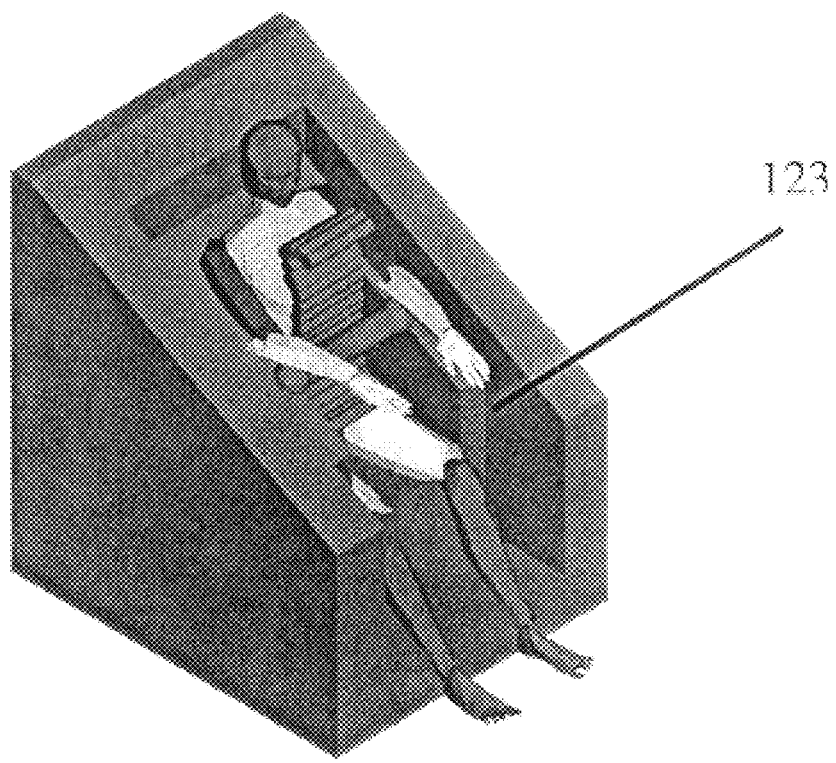
Figure 13:
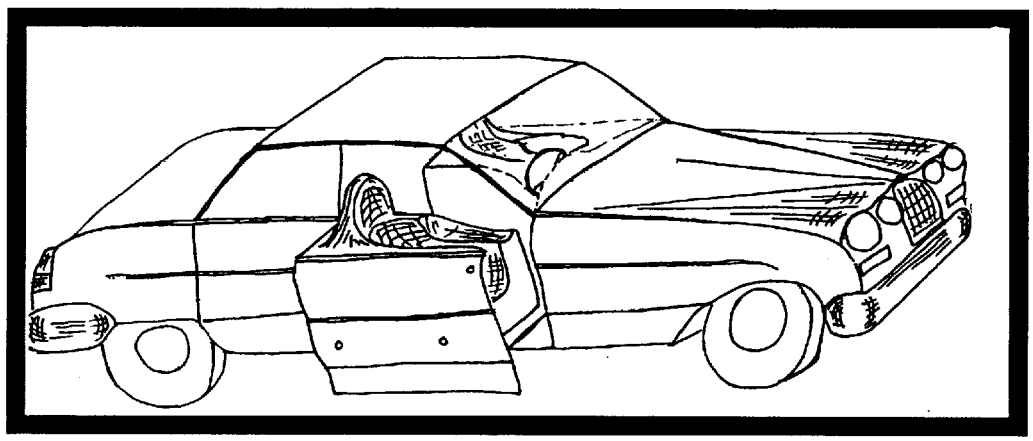
FIG. 13 is an illustration of a drawing of isometric view of the present invention.

FIGS. 12A, 12B and 12C illustrates the detail of the seat (109). The seat (109) may be constructed with customizable multi-elements that conform to the desired shape and provide the desired support for the passenger. Such adjustments may be effected using conventional seat control devices. In this figure the Safety Harness (119) is secured to the sides of the contoured seat (109) between the arm rests (122). The safety harness (119) may be designed to protect the passenger in head-on collisions by providing a soft barrier in close proximity to the body but not necessarily touching the body. This arrangement may be preferred to seat belts that do not provide the extended surface area that the harness (119) provides and as result provides greater impact resistance for the same level of limiting forces that the body can withstand. Moreover, this arrangement may obviate the need for a front collision airbag as the harness (119) may be high enough to support the face and neck under collision conditions. The harness may be constructed of pliable but semi-rigid material (such as high strength nylon) to provide support in a head on collision. A natural benefit of the arrangement of the harness (119) and its supports (120) is that lateral forces on the seat are also braced by the harness support (120) in the operating position. FIGS. 12F2 and 12G2 illustrate an embodiment of the harness. Moreover the seat (109) may be constructed with reinforcing on the sides with reinforced seat sides working in conjunction with lateral resistance elements to further protect the passenger from crush injuries. The Seating surface (121) is illustrated in the same figure as are the arm rests (122). In conventional vehicle seat designs the door surface provides the only support on the external side surface which are usually limited to arm rests. This seat (109) provides surround support for the passenger particularly desirable on winding roads. The "Custom contoured seats" customized for each passenger may be created with a multi-element adjustable structure (the customized multi-elements)—manually with inserts or with computer controlled elements—that provide ergonomic passenger comfort providing where desired, lateral support in addition to the support that conventional seats provide, to cradle the entire lower body in the ejector seat. Similarly child seats (123) as in FIG. 12D1, may be designed to protect children. Such seats can be inserted into the seat (109). The Safety harness may also have an attachment for providing greater support for infants and small children.

Additional Embodiments

Figure 7:
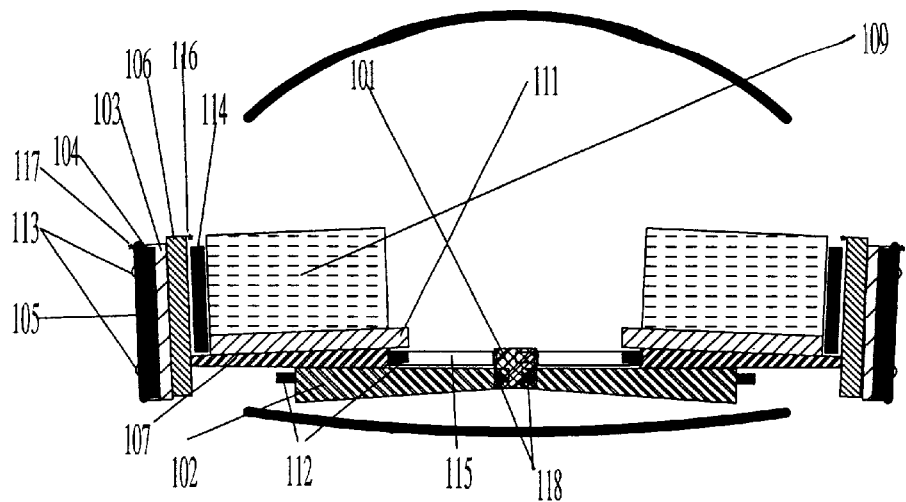
FIGS. 7–9 is an illustration of the Gravity slide drive that may be embodied in the invention.
Figure 8:
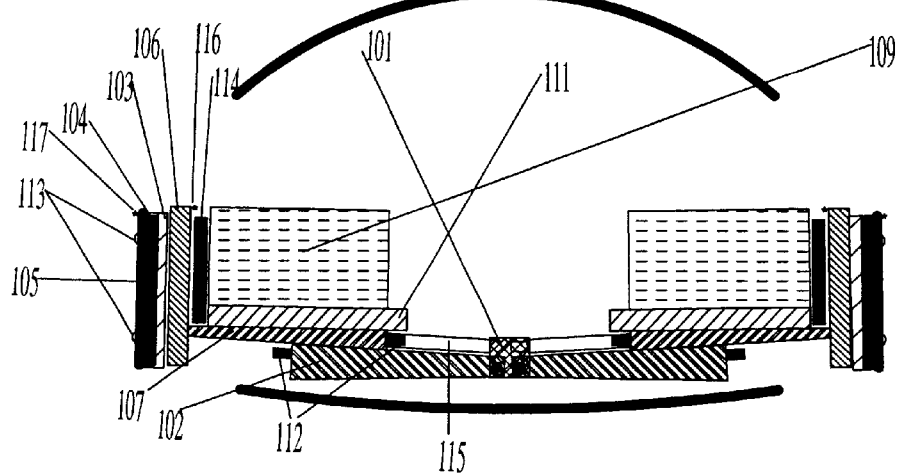
Figure 9:
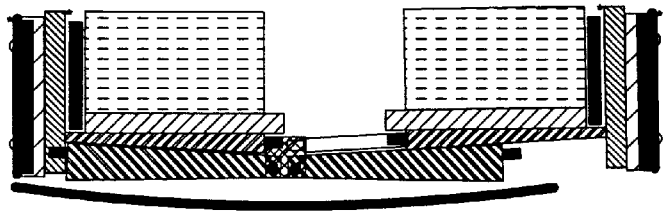

While the above embodiment uses a power slide drive, this embodiment differs in that a gravity slide drive is employed to move the slides for mounting the vehicle. FIGS. 7, 8 and 9 describe this arrangement. This embodiment differs in the preferred embodiment above in that the Safety Beam lower Element/Lower Primary Slide (102) are pivoted at the Central member of the indo-skeletal structure with pivots (118). As shown in FIG. 7, this allows the lower slide to fall to a lower of two positions, that inclines the upper surface of the Lower Primary slide (102) adequately to allow the upper Primary slide (107) to slide outwards to the loading position assisted by the weight of a passenger in the seat and the additional assistance of the Spring arrangement (115). The passenger may dismount from the vehicle when the slide is fully extended as shown in FIG. 7. Each side of the vehicle has independent slides and may be operated by passengers independently.

When the passenger dismounts from the seat the Upper Primary slide (107) in its extended position moves to the higher of two positions about the Pivot (118) as illustrated in FIG. 8. This move inclines the Upper surface of the Lower Primary slide adequately to allow the weight of a passenger to work against the spring arrangement (115) and move the slide to the operating position. This move up of the Lower Primary Slide (107) may be effected by mechanisms well disclosed in the background art. The Slide as depicted in FIG. 8, is now ready for a new Passengers to mount. When the passenger sits on the seat (109), the weight of the passenger works against the spring mechanism (115) to move the slide to the operating position as depicted on the left hand side of the FIG. 9 and lock the slide in the operating position. The Upper Primary Slide may be unlocked by the passenger by depressing the Inside Door Open Button (116). Activating this button in addition allows the lower primary slide (102) to move and be locked to the loading inclination—the lower of two positions, and the Upper Primary Slide (107) is free to slide out with the passenger. At this point the arrangement has completed a full cycle and is in the position depicted in FIG. 7.

The above cycle represents operation of the Gravity Slide Drive when there is a passenger in the seat (109) when the Slide moves to and from the operating position as on the left of FIG. 9. When a passenger dismounts however, and the Slide arrangement needs to be retracted without a passenger in the seat, the weight of the passenger is no longer available for aiding the motion of the slide to the operating position, and the slide must be pushed in against the action of the Spring Arrangement (115) and locked in place at the operating position. When a new Passenger wishes to mount the vehicle, he/she will press the Outside Door Open Button (117) which releases the catch that holds the Upper Primary Slide beam in place but does not affect the movement of the Lower Primary Slide (102) about its pivot (118). The seat as a result slides out on the Upper Primary Slide assisted by the Spring arrangement (115) to the position for mounting the vehicle as depicted in FIG. 7. The Spring arrangement (115) is designed to be such that it provides a force just adequate to move the Upper Primary Slide out with no passenger in the seat.

Alternative Embodiments

In an alternative embodiment to the preferred embodiment, the present invention may use hinged Protector Shields (106) that lock into the Primary Slide (107) when closed. This will allow the arrangement to work for mounting and dismounting the vehicle with either the Primary Slides deactivated or non-operational as well as when they are functional. The seats may also be mounted on rotating mechanisms or extension arms rather than a primary slide, to assist passengers in mounting and dismounting.

Figure 5A:
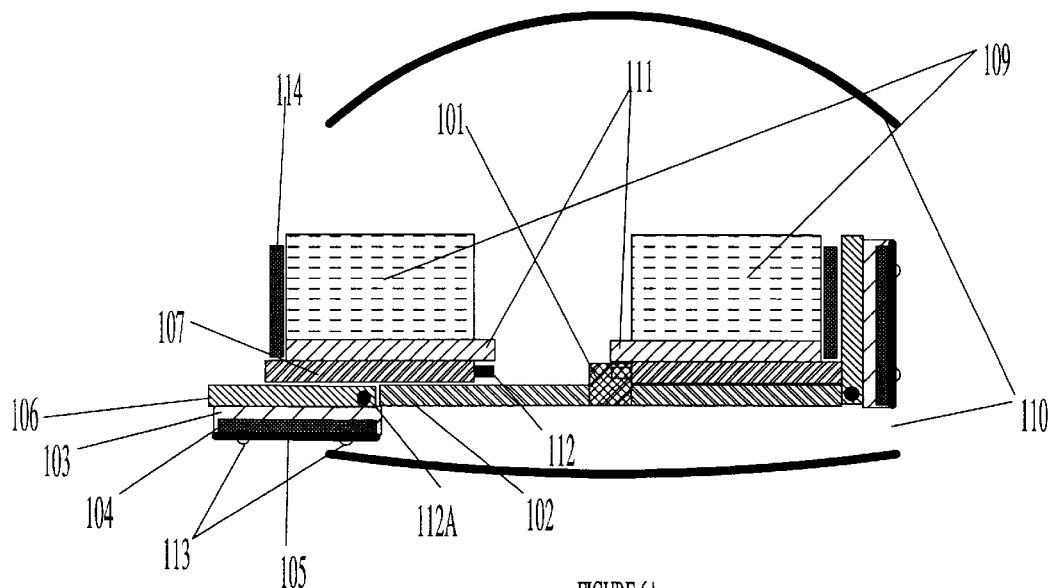
FIGS. 5A and 6A illustrate an embodiment of the current invention with the protector shield/shock absorbers/external airbag hinging down to support the primary slide. A useful feature for larger vehicles with more than a single seat on each side.
Figure 6A:
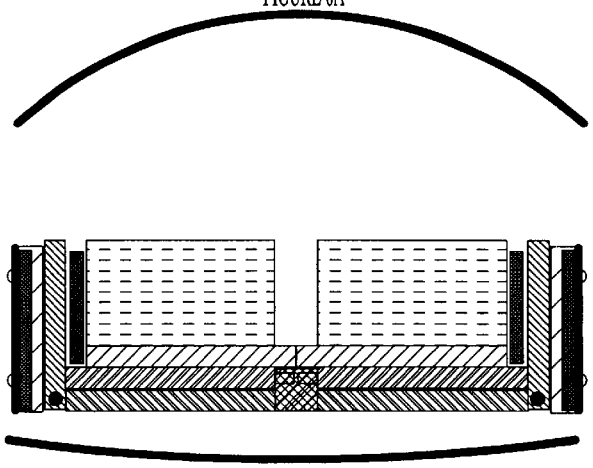

Another alternative embodiment is illustrated in FIGS. 5A and 6A. The "door" that contains the perforation shield (105) with distance/velocity sensors (113), the external airbags (104), the shock absorbers (103) and the protector shields (106), hinges down on the pivot (I 12A) to provide support for the upper primary slide. The inner surface of the Protector shield is designed to perform the function of the lower Primary slide (102). This embodiment will be particularly useful for larger vehicles with a plurality of seats on each side of the vehicle. These multiple seats may be mounted on separate sections of upper primary and secondary slides.

Another alternative embodiment is illustrated in FIGS. 1D to 4D where the Shock Absorbers (103) excluding the External Air bags (104) are mounted on the inner surface of the protector shields (106). As may be seen from the drawings, in this particular embodiment, the shock absorber excluding the external air bags are locked directly to the lower primary slide (102, 102') in the operating position, although in another configuration the locks my be between the protector shield and the lower primary slide in the operating position.

Another alternative embodiment may have a contoured safety harness with a different shape to that of the preferred embodiment. FIGS. 12A1 to 12C1 illustrate an embodiment of a safety harness using a slightly different geometry but performing the same function in the same way as in the preferred embodiment.

Figure 4C:
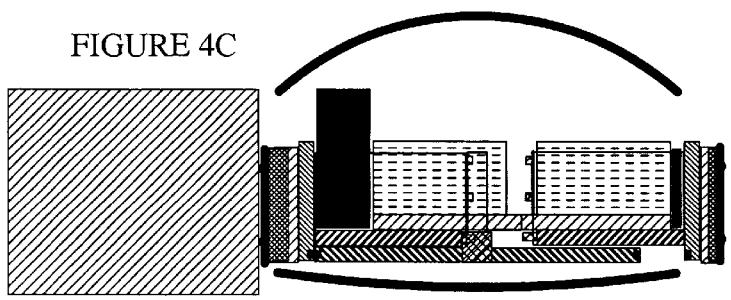

Another alternative embodiment may have an auxiliary slide behind the seat and of any convenient height. This embodiment is shown in FIGS. 1C–4C. The figures illustrate the working of the current invention with a high section of the central member of the indo skeletal structure behind the seats, but abutting the auxiliary beams in the operating position. As the High section of the central member (101) is behind the seats and the secondary slides (111), the seats and the secondary slides are free to move across the vehicle under impact as shown in FIG. 4C.

Yet another alternative embodiment has an external seat profile as illustrated in FIG. 12E1. The higher rectangular external profile provides greater protection to the passenger.

Yet another alternative embodiment has a vertical extension/ "safety cage" (125) as shown in FIGS. 10A1, 10B1 and 10C1. Here the vertical extension/safety cage engages a beam across the top of the vehicle that may be supported by the shell structure of the vehicle (the figure shows only half the width of the vehicle). Such a safety cage/vertical extension can provide protection in a roll over situation and also provide additional compressive strength for the vehicle, and may function as a fixed or retractable roll bar.

Conclusions, Ramifications & Scope

Thus it will become apparent that the present invention presented, provides a new paradigm for implementing key safety features and providing utility in accessing passenger vehicles and comfort in travelling in such vehicles. While the above description provides many specificities, these should not be construed as limitations on the scope of the present invention, but rather as an exemplification of the preferred, an additional and an alternative embodiment thereof Many other variations are possible.

The present invention provides an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. Furthermore, the arrangement allows the installation of a new and unique safety harness that may obviate the need for safety belts and front impact airbags for protection in head-on collisions. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-a-vis the remaining mass of the vehicle. Furthermore the present invention differs sharply from the Background art in that the resulting structure synergistically permits the installation of contoured multi-element surround seats that would not be implementable without the slide arrangements on either side of the vehicle in the present invention.

The present invention provides a gravity slide drive for my arrangement for which there is no counterpart in the Background art. This allows further Utility and weight and energy saving in implementing the above elements of the present invention.

The present invention includes External side Airbags that differ sharply from the Background art in that for the first time they proactively create a "Just in Time" deceleration zone for the lateral or side impact while not remaining in an extended position under normal operating conditions of the vehicle.

The present invention describes an indo skeletal structure of the vehicle body that permits the energy transfer from the lateral or side impact through compressive members to the body of the vehicle. Unlike the Background art this indoskeletal structure is designed to transfer energy to the body of the vehicle without transferring it to the passengers and driver of the vehicle. The passengers are targeted for protection with "Safety zones".

What is claimed is:

1. In a vehicle having a right and left side and substantially massive components, and having at least one fixed body member connected with substantial rigidity to substantially all of the substantially massive components of said vehicle, a vehicle structure having an operating position attained during normal driving conditions and an extended position attained at the time of passenger and operator access to the vehicle, said vehicle structure having a means to divert the impact energy in lateral impacts to be absorbed by said vehicle through the at least one fixed body member while releasing the passengers and operators each having mass, weight, left and right sides, a back and a bottom, to move independently of said vehicle, in a predetermined controlled fashion, in order to minimize injury to such operators and passengers.

2. The vehicle structure of claim 1, further comprising:
a) at least one pair of a safety beam lower elements said pair comprising two members of said pair, each member of said pair having a first face and a second face, and constructed to provide a means to resist compressive lateral impact forces, and to provide support for components attached thereto, a member of each pair of said safety beam lower elements being directly mounted on its second face to the at least one fixed body member, such that said mounting of the two members of each pair are on each of the left side and on the right side respectively of said at least one fixed body member of the vehicle respectively, the members of each pair being mounted at the same longitudinal position of said vehicle;
b) at least one pair of a safety beam upper elements said pair comprising two members of said pair, each member of said pair having a first face and a second face and designed to resist compression, and each of the members of said pair mounted to the first face of each member of a pair of said safety beam lower element on the left and the right sides of the vehicle;
c) pairs of at least one passenger support mechanism each pair comprising two members, members of said pairs being mounted on each of the left and the right sides of said vehicle on at least one lateral axis such that the pair having its members closest to the external surface of the vehicle structure on any one of said lateral axes, constitutes the outermost pair on that lateral axis, and such that the pair having its members closest to the center of the vehicle structure on any one of said lateral axes constitutes an innermost pair;
d) a plurality of impact decoupler/secondary slides each with a first face and a second face, attached by said first face to one member of said pair of said safety beam upper element on the second face of said safety beam upper element and said impact decoupler/secondary slides fixedly attached by said second face to one of the passenger support mechanisms, such that said impact decouplers/secondary slides are normally fixedly attached by said first face to said safety beam upper element, but become decoupled and thereafter slidably attached by said first face to said safety beam upper element along a lateral axis when a lateral shear force greater than a predetermined force is applied to said first face relative to said second face of said impact decouplers/secondary slides allowing said passenger support mechanisms attached to said second face of said impact decouplers/secondary slides to slide along said lateral axis relative to said safety beam upper element, said impact decouplers/secondary slides mounted on each of said safety beam upper element being constructed such that after they are decoupled, they can be guided laterally by, and are slidably attached to one or more of said safety beam upper element mounted on a single pair of said safety beam lower element, and further positioned on the safety beam upper element at all times such that they are not obstructed by any elements of the vehicle in the event that said impact decouplers/secondary slides need under collision conditions to traverse the center of the vehicle to the further side of the vehicle;

e) internal airbags, each mounted on the outer side of and adjoining each of the outermost said passenger support mechanisms, on both the left and the right sides of the vehicle, such that upon detection of an impact event, the airbag deploys one or more of upwards and inwards, next to said passenger support mechanism, to protect the passenger; and f) pairs of at least one protector assembly comprising a shock-absorbing device and a force distributing protector shield, each of said pairs comprising two elements, said elements of each pair being mounted on the left and the right side of the vehicle said protector assembly installed to protect each member of the outermost pair of passenger support mechanisms, on each of the left and right sides of the vehicle, and locked to the fixed body members of the vehicle to be oriented parallel to the sides of the passenger support mechanisms and adjoining said internal airbags, when in the operating position and positioned so as to not interfere with ingress and egress when said passenger support mechanisms are in the extended position.

3. The vehicle structure of claim 2, wherein said protector assembly is attached to the outer end of each of the safety beam upper element supporting each of said outermost pair of passenger support mechanisms, on each of the left and right sides of the vehicle, and constructed to be approximately parallel to the side of the vehicle and approximately vertical and shaped to conform to an area covering substantially a side profile of passengers that require protection from lateral impacts, said protector shield and shock absorbing devices being connected, in such a way to said safety beam upper element such that said protector assembly transfers lateral impact forces as compressive loads on to both the lower and upper primary slides.

4. A vehicle structure of claim 3, wherein said protector assembly is oriented with the shock absorbing device towards the passenger.

5. A vehicle structure of claim 3, wherein said protector assembly is oriented with the protector shield towards the passenger.

6. The vehicle structure of claim 2, further comprising pivotally mounted protector assemblies thereby providing a means for passengers to mount and dismount from said vehicle when desired.

7. The vehicle structure of claim 2, wherein each of said protector assemblies are pivotally attached to the outer end of each of said safety beam lower element on each of the left and right sides of the vehicle, and constructed to be approximately parallel to the side of the vehicle and approximately vertical and shaped to conform to an area covering substantially a side profile of passengers that require protection from lateral impacts, and each constructed to pivot down and outwards on each of the left and right sides of the vehicle to an approximately horizontal position, providing an extension to each of said safety beam lower element to support each of the passenger support mechanisms when they are in the extended position, on the left and the right sides of the vehicle, said protector assembly being connected, in such a way to said safety beam lower element such that it transfers lateral impact forces as compressive loads on to both safety beam lower element and said safety beam upper element.

8. The vehicle structure of claim 2, wherein said protector assemblies, are each detachably mounted to the outer end of each of said safety beam lower element on each of the left and right sides of the vehicle, and constructed to be approximately parallel to the side of the vehicle and approximately vertical and shaped to conform to an area covering substantially a side profile of passengers that require protection from lateral impacts, and each constructed to detach upon impact on the opposite side of the vehicle, and also constructed in such a way to said safety beam lower element set such that they transfer lateral impact forces as compressive loads on to both said safety beam lower element and said safety beam upper element on impact on the same side of the vehicle.

9. The vehicle structure of claim 2, wherein said shock absorbing devices comprise external airbags.

10. A vehicle structure of claim 9, wherein said external airbags are protected by an impervious skin mounted to predetermined external surface of said airbags that are exposed to risk of rupture when said airbags are deployed thereby preventing premature venting of said airbags.

11. The vehicle structure of claim 2, wherein said shock absorbing devices comprise shock absorbers.

12. The vehicle structure as in claim 2, wherein said fixed body members comprise at least one central member of an indo-skeletal structure that abuts a pair of said safety beam lower elements and a pair of said safety beam upper elements, and thereby resists, lateral forces from compressive loads incurred by at least one of said safety beam lower elements and at least one of said safety beam upper elements during impact.

13. The vehicle structure of claim 2, further comprising a construction of said vehicle with minimal components for resistance to lateral collisions except for safety zones, said safety zones being the areas of which are covered by said shock absorbing devices and force distributing protector shields, thereby reducing the mass and resulting weight of the vehicle.

14. The vehicle structure of claim 2, further comprising a compressive load bearing auxiliary beams mounted in the vicinity of the passenger seat(s) to increase the compressive load bearing capability of the structure.

15. The vehicle structure of claim 2, where said protector shields include vertical extensions that protrude vertically above the protector shield and shock absorbing devices to provide resistance to lateral forces at higher physical levels thereby providing further protection to the passengers, and to provide a rigid member that can resist vertical forces adequate to support said vehicle in a roll over situation, thereby protecting said passengers.

16. The vehicle structure of claim 15, further comprising a lateral beam across the top of the vehicle that engages said vertical extension when said element of the safety beam upper element set is in said operating position, to provide a safety cage, thereby providing greater side impact protection and protection in a roll over situation.

17. The vehicle structure of claim 15, wherein said vertical extension is fixedly attached to the protector shield.

18. A vehicle structure of claim 15, wherein said vertical extension is retractably attached to the at least one force distributing protector shield whereby said vertical extension may be retracted downwards into the at least one force distributing protector shield under predetermined conditions.

19. The vehicle structure of claim 2, wherein said safety beam upper element are constructed to be locked to said safety beam lower element.

20. The vehicle structure of claim 2, wherein each safety beam lower element has slidably attached to it at least one of said safety beam upper elements on said first face of said safety beam upper element, such that said safety beam upper elements move independently of each other, along said safety beam lower element, such that in the operating position of said safety beam upper element on each of the left and the right sides of the vehicle, said safety beam upper elements being positioned adjoining each other within the vehicle with the innermost safety beam upper element on each of the left and the right sides of the vehicle locked to the fixed body members, and the outermost safety beam upper element on left and the right sides of the vehicle, locked to the fixed body members, and such that when in an extended position the second face of each of said safety beam upper elements lie substantially outside and adjacent to the side of the vehicle, and constructed such that said safety beam upper elements on the left side of said vehicle provide resistance to lateral impact forces originating from the left side of said vehicle by engaging said fixed body members, while sliding to the left along a lateral axis guided by said safety beam lower elements to provide controlled and substantially minimal resistance to lateral impact forces originating from the right side of the vehicle, and such that said safety beam upper elements on the right side of said vehicle provide resistance to lateral impact forces originating from the right side of said vehicle by engaging said fixed body members, while sliding to the right along a lateral axis guided by said safety beam lower elements to provide controlled and substantially minimal resistance to lateral impact forces originating from the left side of the vehicle.

21. The vehicle structure of claim 20, further comprising a plurality of locking devices attached to the fixed body members and to one or more of the upper primary slides, the protector shields and the shock absorbing devices such that when said upper primary slides are in the operating position, activation of said locks will bind the one or more of the safety beam upper elements, the protector shields and the shock absorbing devices to said fixed body members of the vehicle.

22. The vehicle structure of claim 2, further comprising an independantly ejectable mechanism for each of said passenger support mechanisms, wherein:

a) said independently ejectable mechanisms for the passenger support mechanisms on the left side of the vehicle are mounted indirectly to fixed body members on the left side of said vehicle to allow said passenger support mechanisms on the left side of the vehicle to eject by one of: sliding along a lateral axis to a position substantially outside and adjoining the vehicle; rotating to face substantially outside the vehicle; extending to face substantially outside the vehicle and moving outwards from the vehicle, to a position substantially adjoining the vehicle on the left side thereby allowing said passengers that ride on said passenger support mechanisms on the left side of said vehicle to egress and ingress from the left side of the vehicle by ejecting said independently ejectable mechanisms; and b) said independently ejectable mechanisms for the passenger support mechanisms on the right side of the vehicle are mounted indirectly to fixed body members on the right side of said vehicle to allow said passenger support mechanisms on the right side of the vehicle to eject by one of: sliding along a lateral axis to a position substantially outside but adjoining the vehicle; rotating to face substantially outside the vehicle; extending to face substantially outside the vehicle and moving outwards from the vehicle, to a position substantially adjoining the vehicle on the right side thereby allowing said passengers that ride on said passenger support mechanisms on the right side of said vehicle to egress and ingress from the right side of the vehicle by ejecting said independently ejectable mechanisms.

23. The vehicle structure of claim 22, further providing a means to utilize gravitational forces to drive in the required direction, said slidably attached passenger support mechanisms, comprising:

a) said pairs of safety beam lower elements, a member of each pair on each of the left and right side of the vehicle, each member comprising a sliding surface, said safety beam lower elements being pivotally mounted on the fixed body members of the vehicle such that said pivotally mounted safety beam lower elements can move to and be locked into one of at least two possible inclinations from the center of the vehicle, wherein said sliding surface on each of said pivotally mounted safety beam lower elements assumes a predetermined inclination to facilitate sliding of slidably attached passenger support mechanisms, in the required direction;

b) energy storing devices including spring mechanisms indirectly attached to each of said ejectable passenger support mechanisms, that partially convert and store the potential energy of the passengers and said ejectable passenger support mechanisms moving under gravity;

c) passenger operable switching devices installed on both the inside and the outside of each of the protector shields/shock absorbing devices on either side of said vehicle in positions such that said passenger operable switching devices on the inside of each of said protector shields/shock absorbing devices is acessible to passengers in the outermost passenger support mechanisms and said passenger operable switching devices on the outside of said protector shields/shock absorbing devices are accessible to entering passengers outside the vehicle;

d) logic devices that utilize the presence of the weight of the passengers in each of said passenger support mechanisms, the status of passenger operable switching devices inside and outside the vehicle and the position of said ejectable passenger support mechanisms, to operate locking devices that lock said primary slide to one of said predetermined inclinations and lock the passenger support mechanisms and attached devices when in the operating position.

24. The vehicle structure of claim 22, wherein said shock-absorbing devices and force distributing protector shields, are each pivotally attached to the outer end of each of the safety beam lower elements on each of the left and right sides of the vehicle, and constructed to be approximately parallel to the side of the vehicle and approximately vertical and shaped to conform to an area covering substantially a side profile of the passengers that require protection from lateral impacts, and each constructed to pivot down and outwards on each of the left and right sides of the vehicle to an approximately horizontal position, providing an extension to each of the safety beam lower elements to support each of the passenger support mechanisms and attached sliding devices when they are extended, on the left and the right sides of the vehicle, said protector shield and hook absorbing devices being connected, in such a way to said safety beam lower elements such that they transfer lateral impact forces as compressive loads to one or more of the safety beam lower elements and safety beam upper elements.

25. The vehicle structure of claim 22, further comprising special locking devices that lock said slides and attached devices in the operating position, activated by switches that activate under prespecified conditions including the activation of the ignition for the vehicle motor.

26. The vehicle structure of claim 2, wherein said passenger support mechanisms further comprise contoured seats that provide a means for support to the body of said passenger on both the left and right sides of the body of said passenger as well as at the back and the bottom of the body of said passenger.

27. The vehicle structure of claim 26, further comprising lateral resistance elements in said contoured seats, that provide resistance to lateral crushing forces during lateral impact thereby protecting the seated passenger.

28. The vehicle structure of claim 26, the contoured seats further comprising a pair of arm rests each element of said pair having an inside and an outside edge, and each element of the pair being integrated into the left and the right sides respectively, of said contoured seats to support the arms of the seated passenger in convenient and comfortable positions.

29. The vehicle structure of claim 26, wherein said contoured seats further comprise a removeable and lockable safety harness that is mounted with safety harness supports to said contoured seats to form a protective surface that will resist the forward motion of a major part of the upper body in the event of rapid deceleration of the vehicle such as in a head-on collision, said safety harness supports being removable and lockable on at least one support point and pivotally supported on at least one support point to allow passenger to mount and dismount said contoured seats.

30. The vehicle structure of claim 29, further comprising mounts for said safety harness connected to the inner edge of each of said arm rests of said contoured seats.

31. The vehicle structure of claim 30, wherein said safety harness comprises members that resist lateral compressive loads applied externally to the sides of said contoured seats by providing resistive compressive forces through said safety harness supports between the armrests and attached to both the left and right sides of the seat.

32. The vehicle structure of claim 26, wherein said contoured seats comprise customizable multi-elements that allow said passenger to modify the shape and size of said contoured seat, said modifications being effected by said passenger with predetermined levels of automation and resulting in greater comfort to the passenger.

33. The vehicle structure of claim 26, wherein the inside surface of said contoured seats accommodate inserts for the safe support of infants.

34. The vehicle structure of claim 2, further comprising a structure for Just-in-time impact energy absorption for protecting an impacted body, comprising:

a) proactive impact sensors that provide a means to detect an impact event prior to said impact, detection of said impact event comprising the detection of at least one of the expected timing and expected severity of said impact, said proactive impact sensors being attached to an element of the set consisting of the impacting body and said impacted body and pointed in a predetermined direction of expected impact;

b) a decelaration zone comprising a region of free space adjacent to said impacted body immediately prior to impact and in the vicinity of said proactive impact sensors, said region extending to a sufficient distance from position of said impacted body immediately prior to said impact to provide deceleration of an impacting object at velocities below a predetermined maximum velocity and of impacting mass below a predetermined maximum mass;

c) shock absorbing devices that are normally retracted and attached to an element of the set consisting of the impacting object and said impacted body at one end of said deceleration zone and arranged to be deployed by said proactive impact detectors when an impact event is detected, at which time said shock absorbing devices are extended across the free space of said deceleration zone to the opposite end of said deceleration zone relative to the position of said shock absorbing devices prior to deployment, said extension occurring immediately prior to the impacting body entering said deceleration zone, such that said impacting body makes contact with the substantially fully deployed shock absorbing devices on entering the deceleration zone and whereby the impacting body is subsequently decelerated by said shock absorbing devices as it traverses said deceleration zone.

35. The vehicle structure of claim 34, wherein said proactive impact sensors are sensors that detect the relative velocity and distance of said impacting object relative to said impacted body.

36. The vehicle structure of claim 34, wherein said shock absorbing devices comprise shock absorbers.

37. The vehicle structure as in claim 34, wherein said shock absorbing devices comprise internal airbags and wherein said impact sensors detect the expected timing and severity of the impending secondary impact by observation of the imminent primary impact.

38. The vehicle structure as in claim 34, wherein said shock absorbing devices comprise external airbags including an impervious skin mounted to predetermined external surface of said airbags that are exposed to risk of rupture when said airbags are deployed.

39. A vehicle structure as in claim 1, further comprising:

a) at least one passenger support mechanism on each of the left side and on the right sides of the vehicle that supports said passenger and moves with said passenger to allow egress and ingress; and b) a protector assembly for the protection of passengers having a top and a bottom on each of the left and on the right sides of the vehicle and located at the outside of the furthermost passenger support mechanisms on each of the left side and the right side of the vehicle, and that moves to allow egress and ingress.

40. A vehicle structure as in claim 39, wherein said passenger support mechanism moves laterally with regard to the vehicle to allow passenger egress and ingress.

41. A vehicle structure as in claim 39, wherein said passenger support mechanisms are supported by rotating mechanisms to allow passengers egress and ingress.

42. A vehicle structure as in claim 40, wherein protector assembly moves laterally with regard to the vehicle to allow egress and ingress of the passenger.

43. A vehicle structure as in claim 40, wherein said protector assembly moves pivotally about a horizontal axis located substantially at the said bottom of said safety assembly.

44. A vehicle structure as in claim 41, wherein said protector assembly is fixedly attached to the passenger support mechanism such that movement of the combination is sufficient for egress and ingress of the passenger.

45. A vehicle structure of claim 2, wherein said protector assembly moves parallel to said at least one passenger support mechanism on each side of the vehicle, when said at least one passenger support mechanism moves between the operating position and the extended position for passenger egress and ingress.

46. A vehicle structure of claim 2, wherein each of said protector assemblies on the left and right side of the vehicle move pivotally about horizontal axes, each of said axes being parallel to the direction of motion of the vehicle and located both below and outside the outermost passenger support mechanism on the left and the right side respectively, said movement of said protector assemblies being substantially concurrent with the movement between the operating position and the extended position of the passenger support mechanism for passenger egress and ingress.

47. A vehicle structure of claim 2, wherein said safety beam upper element is rotationally mounted to said safety beam lower element.

48. A vehicle structure of claim 2, wherein said safety beam upper element is mounted to the safety beam lower element, slidably along a lateral axis relative to the vehicle.

49. A vehicle structure of claim 2, wherein said safety beam upper element is mounted to the safety beam lower element to allow rotational movement and translation movement.

50. A vehicle structure as in claim 1, comprising at least one passenger support mechanism that each support a passenger on the left and right sides, the back and bottom and a means to divert the impact energy in lateral impacts from said passenger support mechanism.

51. A vehicle structure as in claim 50, wherein said means to divert the impact energy in lateral impacts from said passenger support mechanism, comprise at least one shock absorbing element, said shock absorbing element being mounted between said passenger support mechanism at one end, and one or more other elements of the vehicle structure that transmit impact forces from the impacting object, at the other end.

52. A shock absorbing element as in claim 51, comprising at least one airbag deployed between the impacted surface and the passenger support mechanism at the time of the lateral impact.

53. A vehicle structure as in claim 50, further comprising a means to control at least one of the position, speed and acceleration of the passenger support mechanism within said vehicle structure in a predetermined fashion relative to one or more predefined elements of said vehicle structure, following a lateral impact to said vehicle.

54. A vehicle structure as in claim 53, wherein said means to control at least one of the position, speed and acceleration of the passenger support mechanism comprises friction based braking between one surface attached to said passenger support mechanism and the other surface attached to one or more other elements of the vehicle structure.

55. The vehicle structure of claim 50, wherein each of said at least one passenger support mechanism is supported in the operating position by one or more impact decoupler/secondary slides each with a first face and a second face, attached by said first face to said one or more fixed members of said vehicle when in the operating position and fixedly attached by said second face to one of the passenger support mechanisms, such that said impact decouplers/secondary slides are normally fixedly attached by said first face to said at least one fixed members of the vehicle in the operating position, but become decoupled and thereafter slidably attached by said first face to said at least one fixed element of said vehicle, along a lateral axis when a lateral shear force greater than a predetermined force is applied to said first face relative to said second face of said impact decouplers/secondary slides allowing said passenger support mechanisms attached to said second face of said impact decouplers/secondary slides to slide along said lateral axis relative to said fixed members of the vehicle, said impact decouplers/secondary slides guided laterally by, and are slidably attached to at least one of the fixed members of the vehicle in the operating position.

56. In a vehicle having a vehicle structure comprising a right and a left side an independantly ejectable mechanism for each of said passenger support mechanisms each of said passenger support mechanisms comprising side support elements for the passenger therein, wherein:
 a) said independently ejectable mechanisms for the passenger support mechanisms on the left side of the vehicle are mounted indirectly to fixed body members on the left side of said vehicle to allow said passenger support mechanisms on the left side of the vehicle to eject by one of: sliding along a lateral axis to a position substantially outside and adjoining the vehicle; rotating to face substantially outside the vehicle; extending to face substantially outside the vehicle and moving outwards from the vehicle, to a position substantially adjoining the vehicle on the left side thereby allowing said passengers that ride on said passenger support mechanisms on the left side of said vehicle to egress and ingress from the left side of the vehicle by ejecting said independently ejectable mechanisms; and
 b) said independently ejectable mechanisms for the passenger support mechanisms on the right side of the vehicle are mounted indirectly to fixed body members on the right side of said vehicle to allow said passenger support mechanisms on the right side of the vehicle to eject by one of: sliding along a lateral axis to a position substantially outside but adjoining the vehicle; rotating to face substantially outside the vehicle; extending to face substantially outside the vehicle and moving outwards from the vehicle, to a position substantially adjoining the vehicle on the right side thereby allowing said passengers that ride on said passenger support mechanisms on the right side of said vehicle to egress and ingress from the right side of the vehicle by ejecting said independently ejectable mechanisms.

57. The vehicle structure of claim 56, wherein said passenger support mechanisms further comprise contoured seats that provide a means for support to the body of said passenger on both the left and right sides of the body of said passenger as well as at the back and the bottom of the body of said passenger.

58. The vehicle structure of claim 57, wherein said contoured seats comprise customizable multi-elements that allow said passenger to modify the shape and size of said contoured seat, said modifications being effected by said passenger with predetermined levels of automation and resulting in greater comfort to the passenger.

59. The vehicle structure of claim 57, wherein the inside surface of said contoured seats accommodate inserts for the safe support of infants.

60. The vehicle structure of claim 57, further comprising lateral resistance elements in said contoured seats, that provide resistance to lateral crushing forces during lateral impact thereby protecting the seated passenger.

61. The vehicle structure of claim 57, the contoured seats further comprising a pair of arm rests each element of said pair having an inside and an outside edge, and each element of the pair being integrated into the left and the right sides respectively, of said contoured seats to support the arms of the seated passenger in convenient and comfortable positions.

62. The vehicle structure of claim 57, wherein said contoured seats further comprise a removeable and lockable safety harness that is mounted with safety harness supports to said contoured seats to form a protective surface that will resist the forward motion of a major part of the upper body in the event of rapid deceleration of the vehicle such as in a head-on collision, said safety harness supports being removable and lockable on at least one support point and pivotally supported on at least one support point to allow passenger to mount and dismount said contoured seats.

63. The vehicle structure of claim 62, further comprising mounts for said safety harness connected to the inner edge of each of said arm rests of said contoured seats.

64. The vehicle structure of claim 63, wherein said safety harness comprises members that resist lateral compressive loads applied externally to the sides of said contoured seats by providing resistive compressive forces through said safety harness supports between the armrests and attached to both the left and right sides of the seat.

65. The vehicle structure of claim 56, further providing a means to utilize gravitational forces to drive in the required direction, said slidably attached passenger support mechanisms, comprising:

a) pairs of safety beam lower elements comprising two members, a member of each pair on each of the left and right side of the vehicle, each member comprising a sliding surface, said safety beam lower elements being pivotally mounted on the fixed body members of the vehicle such that said pivotally mounted safety beam lower elements can move to and be locked into one of at least two possible inclinations from the center of the vehicle, wherein said sliding surface on each of said pivotally mounted safety beam lower elements assumes a predetermined inclination to facilitate sliding of slidably attached passenger support mechanisms, in the required direction;

b) energy storing devices including spring mechanisms indirectly attached to each of said ejectable passenger support mechanisms, that partially convert and store the potential energy of the passengers and said ejectable passenger support mechanisms moving under gravity;

c) passenger operable switching devices installed on both the inside and the outside of each of the sides of the vehicle immediately adjoining the outermost passenger support mechanisms on either side of said vehicle in positions such that said passenger operable switching devicess on the inside of each of said sides of vehicle is acessible to passengers in the outermost passenger support mechanisms and said passenger operable switching devices on the outside of said sides of vehicle are accessible to entering passengers outside the vehicle;

d) logic devices that utilize the presence of the weight of the passengers in each of said passenger support mechanisms, the status of passenger operable switching devices inside and outside the vehicle and the position of said ejectable passenger support mechanisms, to operate locking devices that lock said safety beam lower element to one of said predetermined inclinations and lock the passenger support mechanisms and attached devices when in the operating position.

66. The vehicle structure of claim 56, further comprising a protector shield, pivotally attached to the outer ends of each of the left and the right safety beam lower elements, such that under normal operating conditions of the vehicle, said protector shield is approximately vertical, thereby protecting the passenger and the inside of the vehicle, but under prespecified conditions including the mounting and dismounting of passengers, said protector shield pivot down and outwards relative to said safety beam lower element to an approximately horizontal position, to provide an extension to the safety beam lower element for providing support for said ejectable passenger support mechanisms.

67. A vehicle comprising a motor with the vehicle structure of claim 56, further comprising special locking devices that lock said safety beam upper elements and attached devices in the operating position, activated by switches that activate under prespecified conditions including the activation of the ignition for the vehicle motor.

68. A method for providing side impact protection for passengers in a vehicle having an inertial mass, comprising:

detecting the severity and timing of an impending impact;

establishing a measured deceleration zone;

deploying shock absorbing devices to extend across said deceleration zone;

decelerating the impacting object with said shock absorbing devices against the inertial mass of the vehicle while concurrently providing lateral support for passengers and guiding the passengers to slide away from the impact at a predetermined measured rate along a predetermined path lateral to the vehicle; thereby protecting said passengers from crushing and impact injuries resulting from the collision. *impacting object at velocities below a predetermined maximum velocity and of impacting mass below a predetermined maximum mass; c) shock absorbing devices that are normally retracted and attached to an element of the set consisting of the impacting object and said impacted body at one end of said deceleration zone and arranged to be deployed by said proactive impact detectors when an impact event is detected, at which time said shock absorbing devices are extended across the free space of said deceleration zone to the opposite end of said deceleration zone relative to the position of said shock absorbing devices prior to deployment, said extension occurring immediately prior to the impacting body entering said deceleration zone, such that said impacting body makes contact with the substantially fully deployed shock absorbing devices on entering the deceleration zone and whereby the impacting body is subsequently decelerated by said shock absorbing devices as it traverses said deceleration zone.

* * * * *